(12) United States Patent
Akyol et al.

(10) Patent No.: US 10,263,786 B2
(45) Date of Patent: *Apr. 16, 2019

(54) INTELLIGENT SENSOR AND CONTROLLER FRAMEWORK FOR THE POWER GRID

(71) Applicant: Battelle Memorial Institute, Richland, WA (US)

(72) Inventors: Bora A. Akyol, Richland, WA (US); Jereme Nathan Haack, West Richland, WA (US); Philip Allen Craig, Jr., West Richland, WA (US); Cody William Tews, Richland, WA (US); Anand V. Kulkarni, Richland, WA (US); Brandon J. Carpenter, Kennewick, WA (US); Wendy M. Maiden, Pasco, WA (US); Selim Ciraci, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,959

(22) Filed: Jan. 19, 2018

(65) Prior Publication Data
US 2018/0159691 A1 Jun. 7, 2018

Related U.S. Application Data

(62) Division of application No. 14/746,577, filed on Jun. 22, 2015, now Pat. No. 9,923,723, which is a division
(Continued)

(51) Int. Cl.
*H04L 9/32* (2006.01)
*H04L 29/06* (2006.01)
(Continued)

(52) U.S. Cl.
CPC ............ *H04L 9/3247* (2013.01); *G06F 21/44* (2013.01); *H04L 63/08* (2013.01);
(Continued)

(58) Field of Classification Search
CPC .... H04B 2203/5433; H04B 2203/5458; B60L 3/12; Y04S 20/32; Y04S 20/30;
(Continued)

(56) References Cited

U.S. PATENT DOCUMENTS 6,311,105 B1 10/2001 Budike
6,577,906 B1 6/2003 Hurtado et al.
(Continued)

FOREIGN PATENT DOCUMENTS

WO WO 2011-114629 9/2011

OTHER PUBLICATIONS

Akyol et al., "An Intelligent Sensor Framework for the Power Grid," *Proc. ASME 2011 5th Int'l Conf. on Energy Sustainability & 9th Fuel Cell Science, Engineering and Technology Conf.*, 10 pp. (Aug. 2011).
(Continued)

*Primary Examiner* — Brian F Shaw
(74) *Attorney, Agent, or Firm* — Klarquist Sparkman, LLP

(57) ABSTRACT

Disclosed below are representative embodiments of methods, apparatus, and systems for monitoring and using data in an electric power grid. For example, one disclosed embodiment comprises a sensor for measuring an electrical characteristic of a power line, electrical generator, or electrical device; a network interface; a processor; and one or more computer-readable storage media storing computer-executable instructions. In this embodiment, the computer-executable instructions include instructions for implementing an authorization and authentication module for validating a
(Continued)

software agent received at the network interface; instructions for implementing one or more agent execution environments for executing agent code that is included with the software agent and that causes data from the sensor to be collected; and instructions for implementing an agent packaging and instantiation module for storing the collected data in a data container of the software agent and for transmitting the software agent, along with the stored data, to a next destination.

17 Claims, 18 Drawing Sheets

Related U.S. Application Data of application No. 13/204,606, filed on Aug. 5, 2011, now Pat. No. 9,094,385.

(51) Int. Cl.
  *G06F 21/44* (2013.01)
  *G01R 19/25* (2006.01)

(52) U.S. Cl.
  CPC ........ *G01R 19/2513* (2013.01); *H04L 63/123* (2013.01); *H04L 63/126* (2013.01); *Y04S 40/24* (2013.01)

(58) Field of Classification Search
  CPC .... Y02B 90/241; Y02B 90/244; G01D 4/002; G01D 4/004; H04Q 2209/60; H04Q 2209/43; H04Q 2209/20; H04Q 2209/30; H04Q 2209/84; H04Q 2209/86; G06Q 50/06
  See application file for complete search history.

(56) References Cited

U.S. PATENT DOCUMENTS

| | | |
|---|---|---|
| 6,636,781 B1 | 10/2003 | Shen et al. |
| 6,647,300 B1 | 11/2003 | Balasubramanian et al. |
| 7,653,727 B2 | 1/2010 | Durham et al. |
| 8,347,298 B2 | 1/2013 | Kawaguchi et al. |
| 8,478,452 B2 | 7/2013 | Pratt et al. |
| 8,639,392 B2 | 1/2014 | Chassin |
| 8,694,409 B2 | 4/2014 | Chassin et al. |
| 8,700,225 B2 | 4/2014 | Pratt et al. |
| 8,788,415 B2 | 7/2014 | Chassin et al. |
| 9,026,473 B2 | 5/2015 | Chassin et al. |
| 9,087,359 B2 | 7/2015 | Chassin |
| 9,094,385 B2 | 7/2015 | Akyol et al. |
| 9,129,337 B2 | 9/2015 | Chassin et al. |
| 2002/0062334 A1 | 5/2002 | Chen et al. |
| 2004/0006589 A1 | 1/2004 | Maconi et al. |
| 2004/0037315 A1 | 2/2004 | Delautre et al. |
| 2005/0108453 A1 | 5/2005 | Maturana et al. |
| 2005/0132217 A1 | 6/2005 | Srinivasan et al. |
| 2006/0125422 A1 | 6/2006 | Costa |
| 2008/0082981 A1 | 4/2008 | Kawaguchi et al. |
| 2008/0287113 A1 | 11/2008 | Aaltonen et al. |
| 2009/0034418 A1 | 2/2009 | Flammer et al. |
| 2010/0107173 A1 | 4/2010 | Chassin |
| 2010/0114387 A1 | 5/2010 | Chassin |
| 2010/0179862 A1 | 7/2010 | Pratt et al. |
| 2010/0280631 A1 | 11/2010 | Lu et al. |
| 2011/0106321 A1 | 5/2011 | Cherian et al. |
| 2011/0270452 A1 | 11/2011 | Lu et al. |
| 2012/0029720 A1 | 2/2012 | Cherian et al. |
| 2012/0029897 A1 | 2/2012 | Cherian et al. |
| 2012/0119579 A1 | 5/2012 | Jin et al. |
| 2012/0136485 A1 | 5/2012 | Weber et al. |
| 2012/0278220 A1 | 11/2012 | Chassin et al. |
| 2012/0278221 A1 | 11/2012 | Fuller et al. |
| 2013/0013776 A1 | 1/2013 | Tajima |
| 2013/0218495 A1 | 8/2013 | Boone et al. |
| 2013/0218743 A1 | 8/2013 | Chassin et al. |
| 2013/0218744 A1 | 8/2013 | Chassin et al. |
| 2013/0254090 A1 | 9/2013 | Chassin et al. |
| 2013/0268132 A1 | 10/2013 | Pratt et al. |
| 2014/0188689 A1 | 7/2014 | Kalsi et al. |
| 2016/0006569 A1 | 1/2016 | Akyol et al. |

OTHER PUBLICATIONS

Bellifemine (2005). Chapter 5—JADE—A Java Agent Development Framework. Multiagent Systems, Artificial Societies, and Simulated Organizations vol. 15, 2005, pp. 125-147.

Chalkiadakis et al., "Cooperatives of Distributed Energy Resources for Efficient Virtual Power Plants," *Proc. 10th Int'l Conf. on Autonomous Agents and Multiagent Systems—Innovative Applications Track*, pp. 787-794 (May 2011).

Chevaleyre et al., "Issues in Multiagent Resource Allocation," *Informatica*, vol. 30, pp. 3-31 (2006).

Cognitive Agent Architecture, "Welcome to Cougaar," 1 p. (Dec. 2009).

Czajkowski, "Application Isolation in the Java Virtual Machine," *Proc. ACM SIGPLAN, Conf on Object-Oriented Programming Systems, Languages, and Applications*, 13 pp. (Oct. 2000).

EnerNex(2009).Smart Grid Standards Landscape White Paper vo 83, 2009, 33 pp. Retrieved Jul. 14, 2014 from http://osgug.org/Shared%20Documents/Smart%20Grid%20Standards%20Landscape%20White%20Paper%20v0%2083.doc.

Foundation for Intelligent Physical Agents, "FIPA ACL Message Structure Specification," 11 pp. (Dec. 2002).

Gunupudi et al., "SAgent: A Security Framework for JADE," *Proc. 5th Int'l Joint Conf. on Autonomous Agents and Multiagent Systems*, 3 pp. (May 2006).

Guo et al., "A Machine Learning Approach for Fault Detection in Multi-variable Systems," *AAMAS Workshop*, 8 pp. (May 2011).

Hammerstrom et al., "Pacific Northwest GridWise Testbed Demonstration Projects—Part I. Olympic Peninsula Project," PNNL-17167, 157 pp. (Oct. 2007).

Hammerstrom et al., "Pacific Northwest GridWise Testbed Demonstration Projects—Part II. Grid Friendly Appliance Project," PNNL-17079, 123 pp. (Oct. 2007).

Hinrichs et al., "Approaching Decentralized Demand Side Management via Self-Organizing Agents," *AAMAS Workshop*, 8 pp. (May 2011).

Höning et al., "On the integration of power and reserve trade in electricity networks," *AAMAS Workshop*, 8 pp. (May 2011).

International Search Report dated Oct. 22, 2012, for International Patent Application No. PCT/US2012/049201, 2 pp.

Jini.org, "Main Page," 4 pp. (Feb. 2008).

Kamboj et al., "Deploying Power Grid-Integrated Electric Vehicles as a Multi-Agent System," *Proc. 10th Int'l Conf. on Autonomous Agents and Multiagent Systems—Innovative Applications Track*, 8 pp. (May 2011).

Kawamura et al., "Proposal of Distributed Scheduling Heuristics using Mediation Agent," *AAMAS Workshop*, 8 pp. (May 2011).

Klusch (1999). Intelligent Information Agents: Chapter 18—Mobile Agent Security. Springer Berlin Heidelberg. pp. 431-445. http://dx.doi.org/10.1007/978-3-642-60018-0_22.

Kwak et al., "Towards Optimal Planning for Distributed Coordination Under Uncertainty in Energy Domains," *AAMAS Workshop*, 8 pp. (May 2011).

Ligtvoet et al., "A methodology for agent-based modeling using institutional analysis—applied to consumer lighting," *AAMAS Workshop*, 8 pp. (May 2011).

Mihailescu et al., "Dynamic coalition formation and adaptation for virtual power stations in smart grids," *AAMAS Workshop*, 4 pp. (May 2011).

National Institute of Standards and Technology, "Guidelines for Smart Grid Cyber Security: vol. 2, Privacy and the Smart Grid," NISTIR 7628, 69 pp. (Aug. 2010).

NetLogo, "What is NetLogo?," 3 pp. (Dec. 19, 2013).

(56) References Cited

OTHER PUBLICATIONS

Phillips et al., "Agent-Based Control of Distributed Infrastructure Resources," Sandia National Laboratories, Sand Report SAND2005-7937, 120 pp. (Jan. 2006).
Rogers et al., "Adaptive Home Heating Control Through Gaussian Process Prediction and Mathematical Programming," *AAMAS Workshop*, 8 pp. (May 2011).
Saxena et al., "Authenticating Mobile Agent Platforms Using Signature Chaining Without Trusted Third Parties," *IEEE Int'l Conf. on e-Technology, e-Commerce, and e-Service*, pp. 282-285 (Mar. 2005).
Simon et al., "The Squawk Virtual Machine: Java on the Bare Metal," *Proc. ACM SIGPLAN, Conf. on Object-Oriented Programming Systems, Languages, and Applications*, 2 pp. (Oct. 2005).
Smart Grid Interoperability Panel, "Introduction to NISTIR 7628—Guidelines for Smart Grid Cyber Security," 597 pp. (Sep. 2010).
Smathers et al., "Agent Concept for Intelligent Distributed Coordination in the Electric Power Grid," Sandia National Laboratories, Sand report SAND2000-1005, 15 pp. (Mar. 2001).
Smith et al., "Enabling Java for Small Wireless Devices with Squawk and SpotWorld," *Proc. Second Workshop on Building Software for Pervasive Computing*, 5 pp. (2005).
Soo et al., "Finding Optimal Dispatch Schedule of Power Generation Using Locational Marginal Pricing in a Dynamic Market," *AAMAS Workshop*, 8 pp. (May 2011).
Squeak, "Squeak Smalltalk," 2 pp., downloaded from http://www.squeak.org/ (Jun. 2010).
Stouffer et al., "Guide to Industrial Control Systems (ICS) Security," National Institute of Standards and Technology, Special Publication 800-82, 155 pp. (Jun. 2011).
Sun Inner Circle, "Java Technology Takes a Giant Leap into the World of Microdevices," 3 pp., downloaded from http://www.sun.com/emrkt/innercircle/newsletter/0508/feature-tech.html (May 2008).
Szpryngier et al., "Selected Security Aspects of Agent-based Computing," *Proc. Int'l Multiconference on Computer Science and Information Technology*, pp. 205-208 (Oct. 2010).
TILAB, "Welcome to the Java Agent Development Framework," 1 pp. (Jun. 2003).
Vandael et al., "A multi-agent system for managing plug-in hybrid vehicles as primary reserve capacity in a Smart Grid," *AAMAS Workshop*, 2 pp. (May 2011).
Wallace et al., "Multi-Agent System for Nuclear Condition Monitoring," *AAMAS Workshop*, 7 pp. (May 2011).
Wang et al., "Information Transfer Analysis for Ongoing Commissioning of Buildings," *AAMAS Workshop*, 4 pp. (May 2011).
William Farmer, Joshua Guttman, and Vipin Swarup, "Security for Mobile Agents: Authentication and State Appraisal," Proceedings of the 4th European Symposium on Research in Computer Security (ESORICS '96), Sep. 1996, pp. 118-130.
Written Opinion dated Oct. 22, 2012, from International Patent Application No. PCT/US2012/049201, 8 pp.
Yang et al., "A Multi-Agent Framework for Power System Automation," *Int'l Journal of Innovations in Energy Systems and Power*, vol. 1, No. 1, pp. 39-45 (Nov. 2006).
Zimmerman et al., "CONSERVE: Client Side Intelligent Power Scheduling," *AAMAS Workshop*, 4 pp. (May 2011).

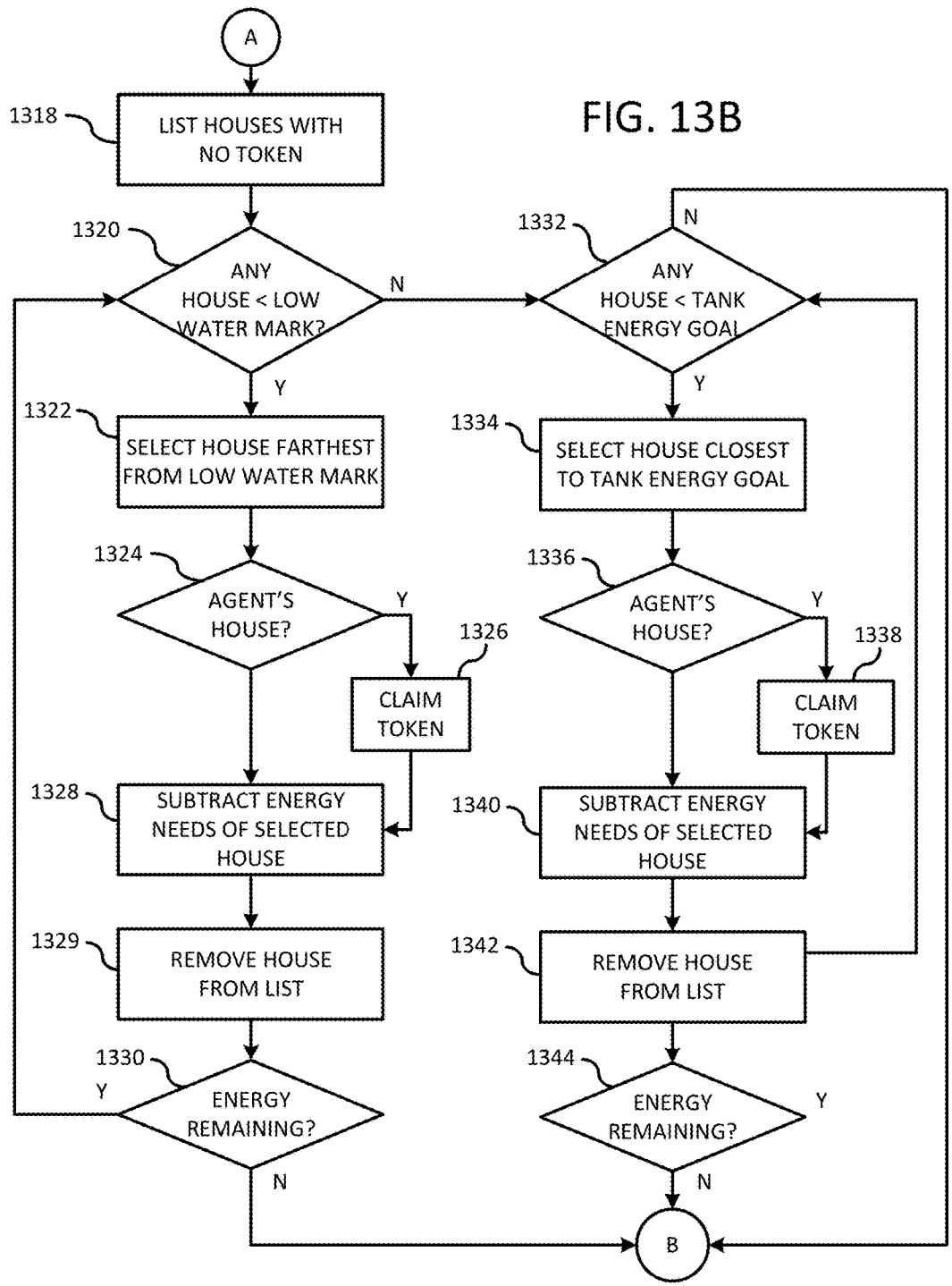

INTELLIGENT SENSOR AND CONTROLLER FRAMEWORK FOR THE POWER GRID

CROSS-REFERENCE TO RELATED APPLICATIONS

This application is a divisional of U.S. patent application Ser. No. 14/746,577, filed Jun. 22, 2015, which is a divisional of prior U.S. patent application Ser. No. 13/204,606, filed Aug. 5, 2011 (now U.S. Pat. No. 9,094,385), which applications are hereby incorporated by reference in their entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

This application relates generally to the field of power grid monitoring and control.

BACKGROUND

The number of sensors and controllers connected to the electric power system is expected to grow by several orders of magnitude over the next several years. However, the information networks that are currently used to transmit and analyze data on the system are ill-equipped to handle the volume of communications resulting from the increased number of sensors. For example, the current information networks are incapable of delivering large amounts of data collected by the sensors in a predictable, time-effective, and reliable manner.

Without the ability to manage and use data from the sensors, the deployment of sensors into the power grid (e.g., phasor measurement sensors into the transmission system and smart meters into the distribution system) will not result in the desired improvements. For example, conventional information networks for power system are incapable of managing two-way power flow, thus hampering efforts to fully utilize distributed generation capabilities (e.g., power generation from home solar panels, electric vehicles, and the like).

Accordingly, improved systems, methods, and apparatus for managing and using data in an electric power grid are desired.

SUMMARY

Disclosed below are representative embodiments of methods, apparatus, and systems for monitoring and using data in an electric power grid. Certain embodiments, for example, bring intelligence from the control rooms of a utility to devices located at or near customer premises. The application of the disclosed embodiments to electrical utilities and to a power grid should not be construed as limiting, however, as the disclosed technology is more generally applicable to other environments in which agent-based data communications are desired.

Among the exemplary embodiments disclosed herein is a method that comprises receiving data representing a software agent, the data including data indicating a cryptographic signature for the software agent, data indicating resource requirements for executing the software agent, and executable code for performing an agent task; determining that the executable code is authorized for execution; and executing the executable code on a processor, thereby performing the agent task. In this exemplary method, the determining that the executable code is authorized for execution comprises verifying that the software agent is authorized using the data indicating the cryptographic signature, and verifying that sufficient computing resources are available for the software agent using the data indicating the resource requirements. In certain implementations, the data representing the software agent further comprises data indicating an identity of an initiator of the software agent, and the act of determining that the executable code is authorized for execution further comprises verifying that the initiator is a recognized and authorized initiator using the data indicating the identity of the initiator of the software agent. In some implementations, the data representing the software agent further comprises data indicating a cryptographic signature for configuration data of the software agent (the configuration data indicating parameters for the executable code and destination nodes for the software agent), and the act of determining that the executable code is authorized for execution further comprises verifying that the configuration data of the software agent has not been altered using the cryptographic signature for the configuration data. In certain implementations, the data representing the software agent further comprises data indicating a cryptographic signature for mutable data of the software agent, and the act of determining that the executable code is authorized for execution further comprises verifying that the mutable data of the software agent has not been altered using the cryptographic signature for the mutable data. In some implementations, the method is performed by computing hardware in communication with one of (a) a sensor for measuring an electrical parameter of a power line of a power grid, (b) a sensor for measuring an electrical parameter of a distributed generator coupled to the power grid, (c) an electrical meter for a household coupled to the power grid, (d) a control unit for one or more household electrical devices that receive power from the power grid, or (e) a control unit for controlling power distribution on the power grid. In certain implementations, the act of executing the executable code comprises instantiating an instance of an agent execution environment, and executing the executable code in the agent execution environment. In some implementations, the agent task is to update agent code for an existing agent. In certain implementations, the method further comprises receiving data from a sensor as a result of executing the executable code on the processor; storing the collected data in a mutable data container of the software agent; and transmitting the software agent, along with the collected data, to a next destination in a manner in which the mutable data container is protected from tampering during transmission. The sensor in such implementations can be configured to measure an electrical characteristic of a power line, a distributed generator, or an electrical device.

Another exemplary embodiment disclosed herein is a system comprising a sensor for measuring an electrical characteristic of a power line, electrical generator, or electrical device; a network interface; a processor; and one or more computer-readable storage media storing computer-executable instructions. In this embodiment, the computer-executable instructions include instructions for implementing an authorization and authentication module for validating a software agent received at the network interface; instructions for implementing one or more agent execution environments for executing agent code that is included with the software agent and that causes data from the sensor to be collected; and instructions for implementing an agent packaging and instantiation module for storing the collected data in a data container of the software agent and for transmitting the software agent, along with the stored data, to a next destination. In certain implementations, the sensor is a phasor measurement sensor. In some implementations, the system is part of an electrical meter for a household on a power grid, or a control unit for one or more household electrical devices that receive power from the power grid. In further implementations, the system is part of a control unit in communication with a power grid. In certain implementations, the one or more computer-readable media further store data indicative of cryptographically verifiable identities, the data indicative of cryptographically verifiable identities being used by the authorization and authentication module to validate the software agent. In some implementations, the one or more computer-readable media further store data indicative of a network identity for the next destination, the network identity being used by the agent packaging and instantiation module to transmit the software agent to the next destination. In certain implementations, the one or more computer-readable media further store instructions for controlling an information exchange bus that facilitates communication to the one or more agent execution environments. In some implementations, the instructions for implementing the one or more agent execution environments include instructions for executing an agent written in a first language in a first execution environment and instructions for executing an agent written in a second language in a second execution environment different from the first execution environment.

Another of the exemplary embodiments disclosed herein is a method that comprises loading data defining an uninitiated software agent, the data defining the uninitiated software agent comprising executable code for performing an agent task; identifying one or more destination nodes to which the software agent is to be transmitted; generating data defining an initiated software agent, the data defining the initiated software agent comprising immutable data that indicates identities of the one or more destination nodes and further indicates configuration parameters for the agent task, data indicating an identity of an initiator of the initiated software agent, data indicating an cryptographic signature of the initiated software agent, and the executable code for performing the agent task. The method further comprises transmitting the data defining the initiated software agent to one of the one or more of the destination nodes. In certain implementations, the method is performed by computing hardware associated with a feeder in a power grid and the one or more destination nodes are nodes corresponding to homes powered by the feeder. In some implementations, the data defining the uninitiated software agent includes data indicating a cryptographic signature of the uninitiated software agent signed by a creator of the uninitiated software agent, and the method further comprises determining that the uninitiated software agent is authorized based at least in part on the cryptographic signature of the uninitiated software agent signed by the creator. In certain implementations, the data defining the uninitiated software agent and the data defining the initiated software agent include data indicating resource requirements for executing the software agent. In some implementations, one or more of the destination nodes are communicatively coupled to (a) a sensor for measuring an electrical parameter of a power line of a power grid, (b) a sensor for measuring an electrical parameter of a distributed generator coupled to the power grid, (c) an electrical meter for a household coupled to the power grid, (d) a control unit for one or more household electrical devices that receive power from the power grid, or (e) a control unit for controlling power distribution on the power grid. In certain implementations, the method is performed by computing hardware associated with a first hierarchical level of a power grid, and the data defining the uninitiated software agent is sent from computing hardware associated with a second hierarchical level of the power grid at a higher level than the first hierarchical level. In some implementations, the data defining the uninitiated software agent includes data indicating a cryptographic signature for the uninitiated software agent generated by the computing hardware associated with the second hierarchical level of the power grid, and the method further comprises determining that the uninitiated software agent is authorized based at least in part on the cryptographic signature for the uninitiated software agent generated by the computing hardware associated with the second hierarchical level of the power grid.

A further exemplary embodiment disclosed herein is a method that comprises generating data defining an uninitiated software agent, the data including executable code for performing an agent task, data indicating an identity of a creator of the uninitiated software agent, and data indicating computing resources required to perform the agent task; and storing the uninitiated software agent on one or more computer-readable storage media. In some implementations, the data defining an uninitiated software agent further includes data indicating a cryptographic signature signed by the creator of the uninitiated software agent. In certain implementations, the agent task is performed at least in part by (a) a sensor for measuring an electrical parameter of a power line of a power grid, (b) a sensor for measuring an electrical parameter of a distributed generator coupled to the power grid, (c) an electrical meter for a household coupled to the power grid, (d) a control unit for one or more household electrical devices that receive power from the power grid, or (e) a control unit for controlling power distribution on the power grid.

Another of the exemplary embodiments disclosed herein is a method that comprises transmitting an outgoing software agent to one or more nodes on a network, wherein at least one of the nodes is communicatively coupled to (a) a sensor for measuring an electrical parameter of a power line of a power grid, (b) a sensor for measuring an electrical parameter of a distributed generator coupled to the power grid, (c) an electrical meter for a household coupled to the power grid, (d) a control unit for one or more household electrical devices that receive power from the power grid, or (e) a power distribution control device coupled to the power grid, and wherein the outgoing software agent includes resource information indicating resources used to execute the software agent and a cryptographic signature for the software agent; and, after the transmission of the outgoing software agent, receiving an incoming software agent that includes data collected from the one or more nodes on the network. In some implementations, the outgoing software agent comprises executable code for collecting data indicative of an operational state of one or more distributed generators coupled to the power grid, and the incoming software agent includes the data indicative of the operational state of the one or more distributed generators. In certain implementations, the outgoing software agent comprises executable code for collecting data indicative of an operational state of one or more power lines coupled to the power grid, and the incoming software agent includes the data indicative of the operational state of the one or more power lines. In some implementations, the outgoing software agent comprises executable code for collecting data indicating one or more of an identity, location, or electrical characteristics of electrical devices associated with each of the one or more nodes, and the incoming software agent includes the data indicating one or more of the identity, location, or electrical characteristics of the electrical devices associated with each of the one or more nodes. In certain implementations, the outgoing software agent comprises executable code for collecting data indicative of a fault location among the one or more nodes, and the incoming software agent includes the data indicative of the fault location among the one or more nodes.

Another of the exemplary methods disclosed herein is a method that comprises receiving information indicative of an energy use goal for one or more distribution power lines in a power network for a time period; receiving information from one or more remote households coupled to respective ones of the distribution power lines, the information from the one or more remote households comprising information indicating an energy demand priority level for each respective remote household; determining an energy demand priority level for a local household; and determining whether to activate one or more electrical devices at the local household during the time period based at least in part on the information indicative of the energy use goal, the information indicating the energy demand priority level for each respective remote household, and the energy demand priority level for the local household. In certain implementations, the determination of whether to activate the one or more electrical devices at the local household during the time period is made using a set of rules that is common among the local household and the one or more remote households. In some implementations, the set of rules allows a household with a higher energy demand priority level to draw additional power before a household with a lower energy demand priority level. In certain implementations, the determination of whether to activate the one or more electrical devices at the local household during the time period is made using a set of rules that is defined in executable code sent to the local household using a software agent. In some implementations, the information received from the one or more remote households is stored as data in a software agent that is sent by a respective one of the one or more household to the local household via a network. In certain implementations, the method further comprises selectively activating the one or more electrical devices at the local household based on the determination of whether to activate the one or more electrical devices at the local household during the time period. In some implementations, the method further comprises transmitting information indicative of the energy demand priority level for the local household to the one or more remote households using a software agent.

Embodiments of the disclosed methods can be performed using computing hardware, such as a computer processor, application specific integrated circuit, or programmable logic device. For example, embodiments of the disclosed methods can be performed by software stored on one or more non-transitory computer-readable media (e.g., one or more volatile memory components (such as DRAM or SRAM) or nonvolatile memory or storage components (such as hard drives)). Such software can be executed on a single computer or on a networked computer (e.g., via the Internet, a wide-area network, a local-area network, a client-server network, or other such network). Embodiments of the disclosed methods can also be performed by specialized computing hardware (e.g., one or more application specific integrated circuits ("ASICs") or programmable logic devices (such as field programmable gate arrays ("FPGAs")) configured to perform any of the disclosed methods). Additionally, any intermediate or final result created or modified using any of the disclosed methods can be stored on a non-transitory storage medium (e.g., volatile memory or storage components (such as DRAM or SRAM) or nonvolatile memory or storage components (such as hard drives)) and are considered to be within the scope of this disclosure. Furthermore, any of the software embodiments (comprising, for example, computer-executable instructions which when executed by a computer cause the computer to perform any of the disclosed methods), intermediate results, or final results created or modified by the disclosed methods can be transmitted, received, or accessed through a suitable communication means.

The foregoing and other objects, features, and advantages of the invention will become more apparent from the following detailed description, which proceeds with reference to the accompanying figures.

BRIEF DESCRIPTION OF THE DRAWINGS

FIGS. 13A and 13B are flow charts for an exemplary method of performing load sequencing according to an embodiment of the disclosed technology.

DETAILED DESCRIPTION

I. General Considerations

Figure 1:
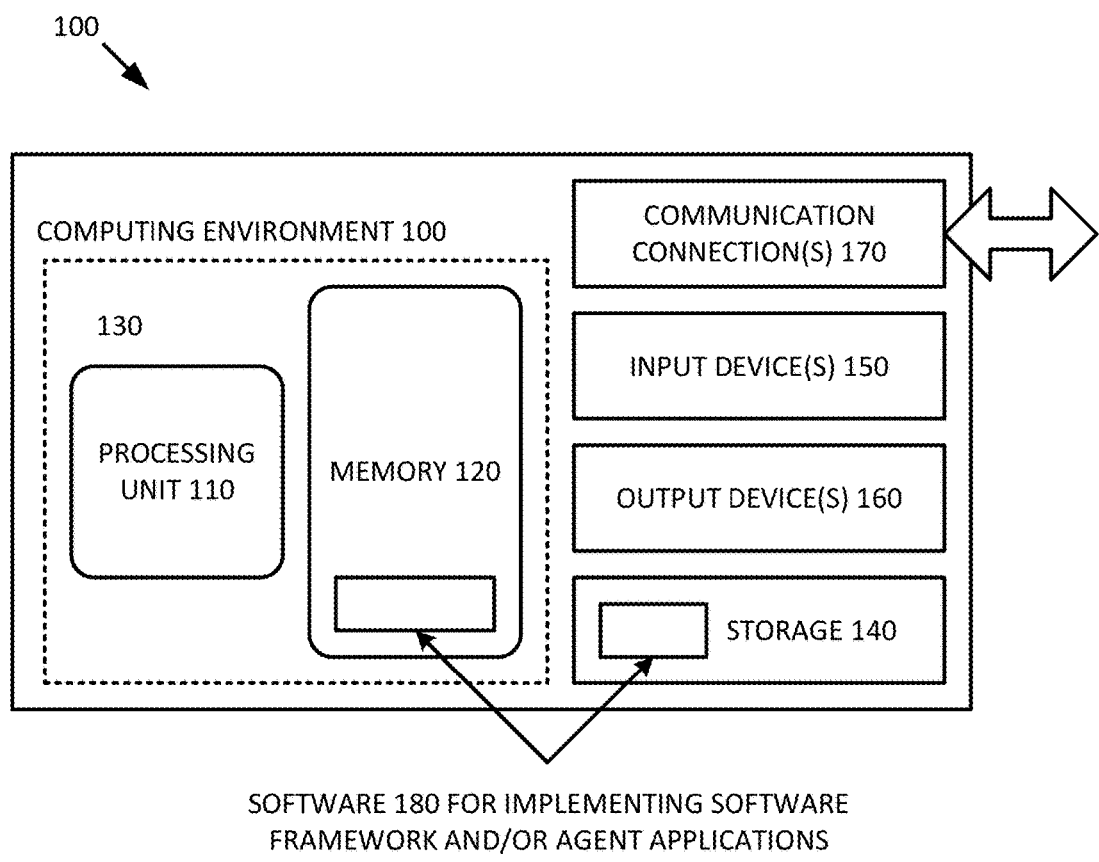
FIG. 1 is a schematic block diagram of a computing environment that can be used to implement embodiments of the disclosed technology.

Disclosed below are representative embodiments of methods, apparatus, and systems for monitoring and controlling a power grid. Particular embodiments are directed toward monitoring and controlling the power grid using an agent-based approach. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art. Furthermore, as used herein, the term "and/or" means any one item or combination of items in the phrase.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer). Any of the computer-executable instructions for implementing the disclosed techniques (e.g., the disclosed agent generation, agent execution, agent upgrading, agent authorization, load sequencing, or other techniques) as well as any intermediate or final data created and used during implementation of the disclosed agent-based systems can be stored on one or more computer-readable media (e.g., non-transitory computer-readable media). The computer-executable instructions can be part of, for example, a dedicated software application or as part of an agent's transport payload that is accessed or downloaded via a network (e.g., a local-area network, a wide-area network, a client-server network, or other such network).

Such software can be executed on a single computer (e.g., a computer embedded in or electrically coupled to a sensor, controller, or other device in the power grid) or in network environment. For example, the software can be executed by a computer embedded in or communicatively coupled to a sensor for measuring electrical parameters of a power line or electrical device, a synchrophasor sensor, a smart meter, a control unit for a home or household appliance or system (e.g., an air-conditioning unit; heating unit; heating, ventilation, and air conditioning ("HVAC") system; hot water heater; refrigerator; dish washer; washing machine; dryer; oven; microwave oven; pump; home lighting system; electrical charger; electric vehicle charger; home electrical system; or any other electrical system having variable performance states), a control unit for a distributed generator (e.g., photovoltaic arrays, wind turbines, or electric battery charging systems), a control unit for controlling the distribution of power along the power grid (e.g., a transformer, switch, circuit breaker, or any other device on the power grid configured to perform a control action), and the like. Further, any of the control units can also include or receive information from one or more sensors.

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, Java, Perl, JavaScript, Adobe Flash, Python, JINI, .NET, Lua or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions which when executed by a computer cause the computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by a computing device comprising an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to a sensor, control unit, or other device in the power grid. For example, the integrated circuit can be embedded in or otherwise coupled to a synchrophasor sensor, smart meter, control unit for a home or household appliance or system, a control unit for a distributed generator, a control unit for controlling power distribution on the grid, or other such device.

FIG. 1 illustrates a generalized example of a suitable computing hardware environment 100 for a computing device with which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 for implementing one or more of the described techniques for operating or using the disclosed agent-based systems. For example, the memory 120 can store software 180 for implementing any of the disclosed agents or agent control techniques.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory storage medium which can be used to store information and which can be accessed within the computing environment 100. The storage 140 can also store instructions for the software 180 implementing any of the described techniques, systems, or environments.

The input device(s) 150 can be a touch input device such as a keyboard, mouse, touch screen, pen, or trackball, a voice input device, a scanning device, or another device that provides input to the computing environment 100. The output device(s) 160 can be a display, touch screen, printer, speaker, or another device that provides output from the computing environment 100.

The communication connection(s) 170 enable communication over a communication medium to another computing entity. The communication medium conveys information such as computer-executable instructions, the agent transport payload, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. Computer-readable media are any available media that can be accessed within or by a computing environment. By way of example, and not limitation, with the computing environment 100, computer-readable media include tangible non-transitory computer-readable media, such as memory 120 and storage 140.

The various methods, systems, and interfaces disclosed herein can also be described in the general context of computer-executable instructions, such as those included in program modules, being executed in a computing environment on a target processor. Generally, program modules include routines, programs, libraries, objects, classes, components, data structures, and the like that perform particular tasks or implement particular abstract data types. The functionality of the program modules may be combined or split between program modules as desired in various embodiments. Computer-executable instructions for program modules may be executed within a local or distributed computing environment.

II. Introduction to the Disclosed Technology

Embodiments of the disclosed technology involve adding intelligence to the sensors, controllers, actuators, and other devices (e.g., smart meters, control units for homes and/or household appliances, control units for distributed generators, and control units used to control power distribution on the power grid) being used in the electric power system. Using embodiments of the disclosed technology, sensors and/or controllers in the electric power system are capable of sharing information through the various layers of the electric power system. Further, the two-way information enabled by the disclosed technology facilitates the integration of distributed resources into the power grid. Several techniques are disclosed, including the use of peer-to-peer communication as well as distributed agents.

Sensors in the power system that can adapted to use embodiments of the disclosed technology include, for example, synchrophasor sensors that are deployed throughout the system, power measurement sensors, current meters, voltage meters, sensors detecting drag or stretch on a transmission line, smart meters, sensors coupled to distributed power generation devices (e.g., photovoltaic arrays, wind turbines, electric vehicle charging stations, and the like), sensors coupled to household devices (e.g., responsive air-conditioning units; heating units; heating, ventilation, and air conditioning ("HVAC") systems; hot water heaters; refrigerators; dish washers; washing machines; dryers; ovens; microwave ovens; pumps; home lighting systems; electrical chargers; electric vehicle chargers; home electrical systems; or any other electrical system having variable performance states), and the like. These sensors can be operable to measure a wide variety of electrical parameters of the power line, generator, or device with which they are associated. For example, depending on the application, a sensor can be configured to measure power usage, voltage, current, phase angle, and/or other such electrical parameters.

Control units in the power system that can be adapted to use embodiments of the disclosed technology include, for example, control units for distributed power generation devices (e.g., photovoltaic arrays, wind turbines, electric vehicle charging stations, and the like), home power management systems, control units for household devices (e.g., responsive air-conditioning units; heating units; heating, ventilation, and air conditioning ("HVAC") systems; hot water heaters; refrigerators; dish washers; washing machines; dryers; ovens; microwave ovens; pumps; home lighting systems; electrical chargers; electric vehicle chargers; home electrical systems; or any other electrical system having variable performance states), control units for controlling the distribution of power along the power grid (e.g., transformers, switches, circuit breakers, or any other device on the power grid configured to perform a control action), and the like. Further, any of the control units can also include or receive information from one or more sensors. For example, a control unit for a hot water heater can be coupled to a sensor for measuring a current energy level in the hot water heater.

In particular embodiments, the disclosed software agents operate on systems with differing levels of computing power. The agents can cooperate to bring computation closer to the data. The types of computation can include control decisions, data analysis, and/or demand/response decisions. When paired with distributed autonomous controllers, the sensors form the basis of an information system that supports deployment of both micro-grids and islanding. For example, embodiments of the disclosed technology form the basis for a broad strategy that enables better integration of distributed generation, distribution automation systems, and decentralized control (e.g., microgrids). In particular embodiments, the disclosed software platform for implementing software agents is used at the distribution layer of the electric power system, where end customers are being served.

In general, the agents described herein comprise software entities that are capable of accomplishing a given task on their own. Also described herein are embodiments of a software framework (also referred to as a "software platform") for using agents that is adapted specifically for the power grid network.

III. Exemplary Agent-Based Software Frameworks for Monitoring and Controlling a Power Grid

A. Introduction

In this section, examples of a suitable software platform (or framework) for supporting adaptive and intelligent sensors, controllers, and electric devices on a power grid are described. Embodiments of the disclosed software platform involve an agent-based architecture that is capable of autonomous or substantially autonomous operation. For example, certain embodiments involve moving the control and decision-making aspects of the power grid toward the edges of the system, thus enhancing distributed operation and increasing both efficiency and reliability. For instance, embodiments of the disclosed software agents can operate as distributed entities, which are given a task to complete and which are capable of cooperating with each other to accomplish the task. Further, embodiments of the disclosed software platform are designed to support both mobile and stationary agents.

Some embodiments of the disclosed intelligent sensors, intelligent controllers, and associated agent-based framework are capable of operating autonomously without requiring intervention from a centralized control point. They can adapt and tailor their measurement methods based on environmental conditions and perform multiple types of measurements belonging to different domains to enable localized autonomous control while also communicating this information back to a system operations center. Alternatively, measurements from multiple single-purpose sensors may be combined by an intelligent sensor aggregator to support legacy sensors that already exist in the power grid The disclosed embodiments of the software platform can exhibit a number of possible advantages, any one or more of which can be present in an implementation of the disclosed technology. For example, embodiments of the disclosed software platform can help (1) meet real-time (or substantially real-time) data processing requirements; (2) improve control system response times by locating intelligence closer to the control points; (3) adjust automatically the resolution and frequency of data being sent across the sensor network based on current state of the systems being observed by the sensor; (4) explore new ways of correlating data from multiple domains such as power systems and network security; (5) create the information channels to enable two-way power flows to speed up the integration of distributed generation in the power system; (6) increase the scalability of the information networks in the electric power grid; and/or (7) allow decentralized control to support micro-grids and islanding.

B. Principles of Operation

This section describes generally how agents implemented according to embodiments of the disclosed software framework can operate in a power system. Before describing the agent operational concepts, the hierarchical organization of embodiments of the disclosed technology are described. In particular, the organizational boundary (termed a "scope of influence" or "SOI") that can be used by agents operating according to the disclosed software framework is described.

1. Scopes of Influence

The electric power system generally follows a fairly hierarchical organizational structure. A country is divided into regions. In each region, there are typically balancing authorities, regional transmission operators, power generation suppliers, and distribution utilities. Within a distribution utility, electric power flows through distribution lines to distribution substations and then to feeder lines that deliver power to customer premises. In certain embodiments of the disclosed technology, the intelligence and distributed computing capabilities follow a substantially similar organizational structure. In the discussion below, the organizational boundary is referred to as the "scope of influence" or "SOI". In particular, the SOI refers to an organizational boundary within which a set of software agents can communicate, cooperate, and exchange information. In certain embodiments, an SOI has one or more non-human "initiators" (e.g., computing entities) that are responsible for initiating and distributing tasks to agents as well as providing ancillary services to the agents within an SOI. These ancillary services can include (but are not limited to) agent discovery and directory services, and trust services (e.g., reputation management and trust negotiation). An initiator may also participate in network services, such as routing and name resolution. In certain embodiments, each SOI has a unique identifier. This unique identifier may be constructed by combining a name, a location, and/or a network address. In general, the initiator can be implemented using any embodiment of the computing devices described herein (e.g., a computer having an architecture such as shown in FIG. 1). Furthermore, within the SOI, the initiator may be located at a central location or a location suitable for the power grid operator to easily control and monitor the initiator (e.g., in a feeder SOI, the initiator can be located at the distribution substation where the feeder originates).

Figure 2:
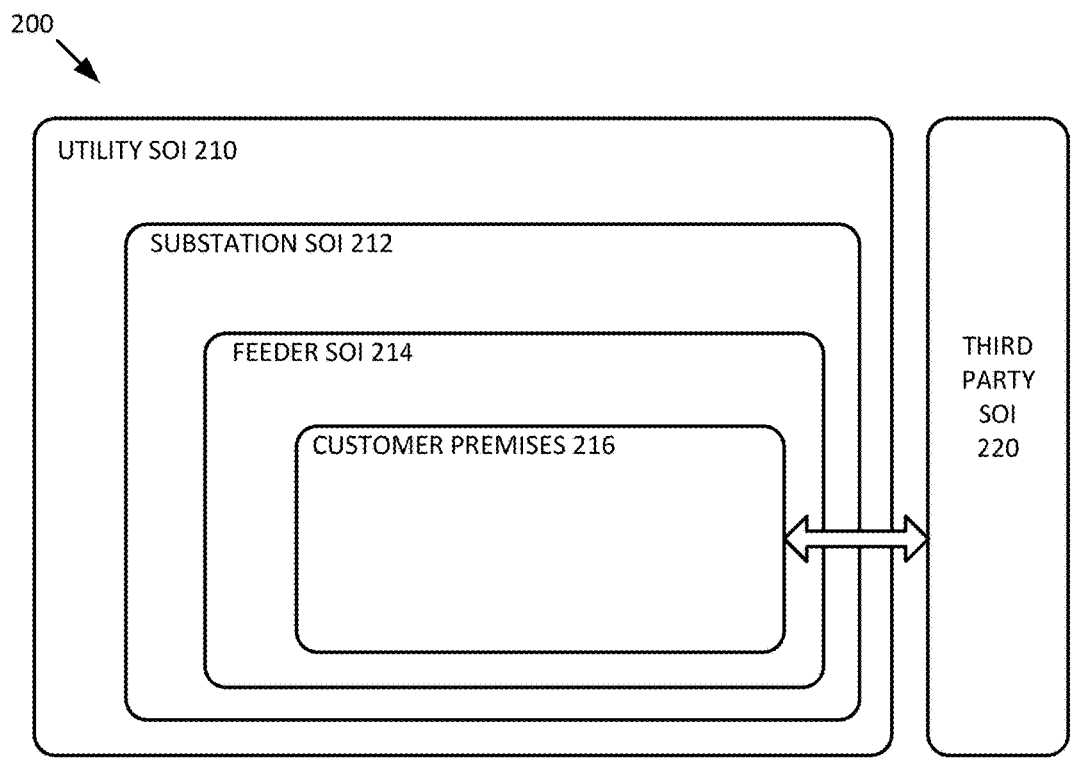
FIG. 2 is a schematic block diagram illustrating an exemplary hierarchy of scopes of influence according to which agents in embodiments of the disclosed technology are organized.

FIG. 2 is a schematic block diagram 200 illustrating multiple SOIs. In the illustrated embodiment, five SOIs are shown, though more or fewer SOIs can exist. In FIG. 2, the following SOIs are illustrated: utility SOI 210, substation SOI 212, feeder SOI 214, and customer premises SOI 216. Further, even though only a single example of each SOI is illustrated in FIG. 2, it is to be understood that on account of the hierarchical structure of the power grid, each SOI can include two or more SOIs at the next lower-order hierarchical level. For example, within a utility SOI, there can be multiple substation SOIs. Within a substation SOI, there can be multiple feeder SOIs. Within a feeder SOI, there can be multiple customer premises SOIs. Note also that while the utility, substation, and feeder SOIs can be under the same administrative authority, the customer premises SOI is more than likely under a different administrative authority. In particular, the customer premises SOI is likely controlled by the customer (e.g., using a home energy management system, multiple responsive home appliances, or the like). Also illustrated in FIG. 2 is a third-party SOI 220, which represents entities that are not utilities and not owned by a utility that perform functions within the power system. The third-party SOI 220 can be, for example, a virtual power plant provider (e.g., a group of distributed generation installations that are collectively run by a central control entity). Note that a customer may choose to trust a third party SOI, even if the utility serving the customer does not.

In one exemplary implementation of the software framework (referred to as the "representative framework"), the framework exhibits the characteristics described below. It is to be understood, however, that other embodiments within the scope of this disclosure can exhibit only one or more or none of these characteristics.

In the representative framework, each SOI has at least one initiator that is responsible for assigning tasks and dispatching agents within the SOI. The task assignment can be performed on the basis of the agent capabilities (examples of which are discussed more fully below). The initiator can also facilitate ancillary services including directory services, trust and reputation management, and communication between this SOI and its parent SOI. While the initiator can itself be considered an agent; it is stationary in the representative framework and has closer integration with the software platform than other software agents. If there is more than one initiator in an SOI, it is assumed that one of the initiators is selected as the initiator (e.g., by the utility or by the initiators collaborating to choose) with all other initiators in the SOI serving the master initiator. Further, in particular implementations, the initiators are provisioned by the administrator of the SOI at system configuration time.

In the representative framework, the administrator of an SOI can upload/enable agents to be run within an SOI. If an administrator manages multiple SOIs, then an agent can be enabled to run within multiple SOIs (e.g., either by separately initiating the agent within each SOI or by initiating a single agent that is assigned to multiple SOIs).

In the representative framework, each SOI has a policy for determining whether an agent is authorized to run within the SOI. This policy is based on factors such as the agent creator's and initiator's trust levels, verification that the agent has not been tampered with and activity-specific authorizations for each type of activity to be performed by the agent. Further, the configuration policies module at an SOI can indicate that any agent from a particular creator or SOI is to be trusted (or not). Additionally, the configuration policies module for an SOI can have: (1) a policy that describes additional authorization requirements (such as trust negotiation) for allowing agents from other SOIs to execute within the SOI; (2) a policy that defines the specific actions that agents from other SOIs are allowed to perform; (3) a policy that describes the allowed communications between agents within an SOI; and/or (4) a policy that describes the allowed communications between agents within the SOI and agents in other SOIs.

2. Overview of the Operation of Agents

An agent comprises a software entity that is capable of accomplishing a given task on its own. In particular, an agent comprises a piece of software (e.g., a set of computer-executable instructions) or software module that acts for a user or other program in a relationship of agency when executed. In the representative framework, an agent's purpose is to accomplish a task assigned to it by the initiator in the SOI that the agent resides in. An agent is originally programmed by its creator to perform a function or to accomplish a task, but is assigned to a particular task by the initiator. The creator may be a vendor, or it could be the utility itself. The initiator is typically a static agent (or non-human computing entity) operated by a representative of the utility (e.g., an SOI administrator at a substation SOI or feeder SOI). In certain implementations, the initiator has access to a library of agents (e.g., stored locally at the computing device implementing the SOI initiator, or stored remotely and remotely accessed) for performing a variety of functions.

In particular implementations, the initiator acts according to a task list that comprises a set of one or more tasks. The task list can be created, updated, or otherwise maintained by an operator of the SOI serviced by the initiator. For example, a task at a feeder SOI may be to check power usage to determine whether there is theft of power on that feeder. The task list implemented by the initiator may include tasks that need to be performed periodically (e.g., at scheduled intervals). Depending on the tasks to be performed by the initiator, a catalog of agents can be stored and accessed by the initiator, the catalog comprising the appropriate set of agents to perform the task.

3. Exemplary Operations of an Agent

To illustrate the operation of an agent, an exemplary scenario in which an agent is dispatched to perform a task on a series of devices within an SOI and returns with collected information to the initiator is described. In this representative example, the task is to collect power outputs from photovoltaic panels on a number of houses in a neighborhood (e.g., at 5-minute intervals) within a feeder SOI. Additional details concerning exemplary embodiments of the described agent creation process, agent initiation process, agent execution process, and agent authentication and authorization process are discussed in more detail below in Section IV and with respect to FIGS. 8-12.

Figure 15:
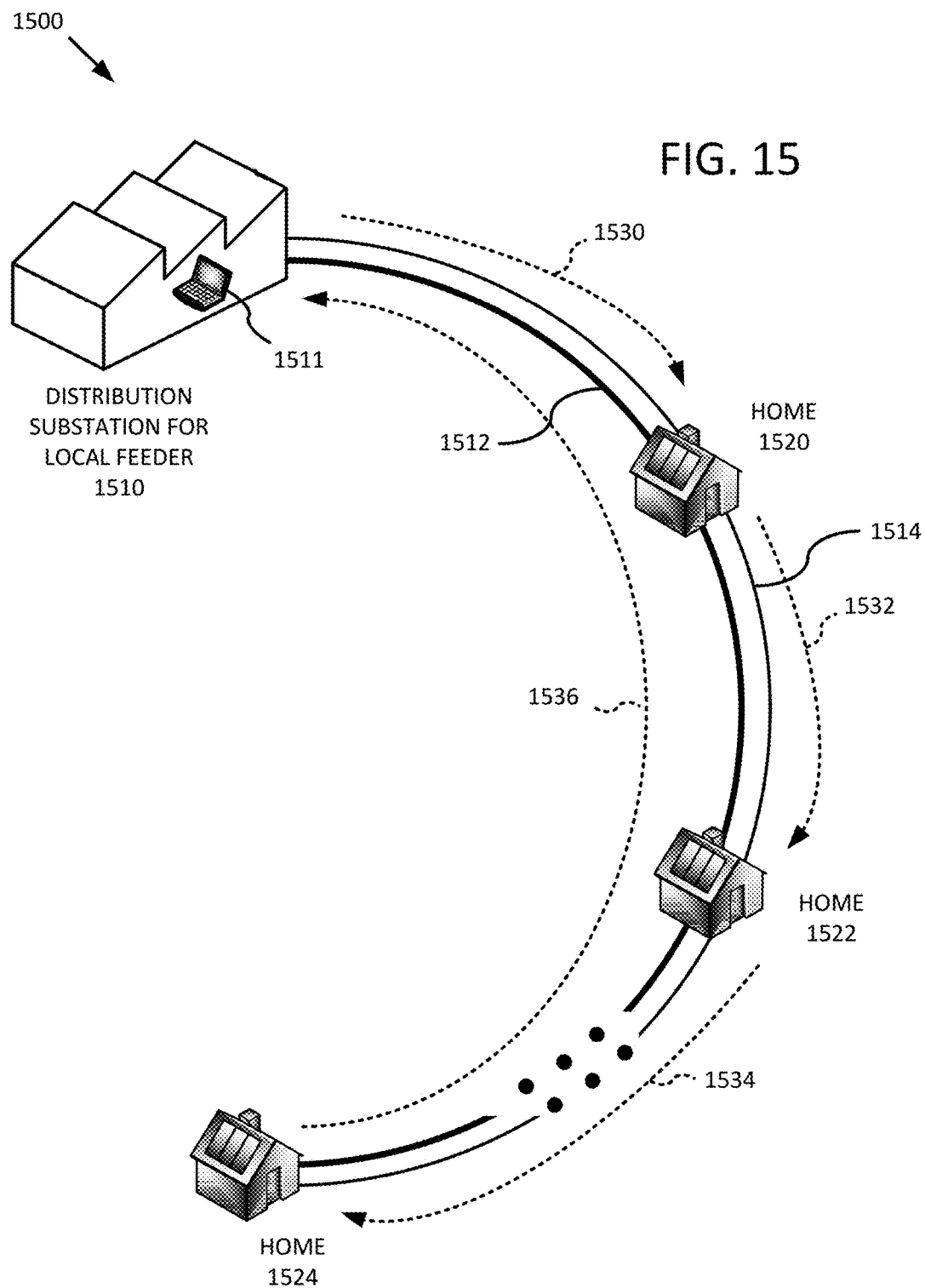
FIG. 15 is a schematic block diagram illustrating the topology and agent movement for one example scenario.

FIG. 15 is a schematic block diagram 1500 illustrating the topology and agent movement for the exemplary scenario. In particular, FIG. 15 illustrates a distribution substation 1510 from which the local feeder 1512 originates. The feeder 1512 is operative to distribute power among multiple homes, including homes 1520, 1522, and 1524. The distribution substation 1510 further comprises the initiator 1511 for an SOI associated with the feeder (in this example, the feeder SOI comprises the homes 1520, 1522, 1524).

In this example, the initiator 1511 is communicatively coupled to intelligent sensors associated with photovoltaic panels on each of the homes 1520, 1522, 1524 via network 1514. The network 1514 can be implemented as a Local Area Network ("LAN") using wired networking (e.g., using the Ethernet IEEE standard 802.3 or other appropriate standard) or wireless networking (e.g. using one of the IEEE standards 802.11a, 802.11b, 802.11g, or 802.11n or other appropriate standard). Furthermore, at least part of the network 1514 can be the Internet or a similar public network. The initiator 1511 and the intelligent sensors at the homes 1520, 1522, 1524 can be implemented using any of the computing devices or computer architectures described above (e.g., general-purpose computing devices or specialized computing devices (such as ASICs or FPGAs)). Further, the computing devices can operate using embodiments of the disclosed agent-based software platform.

In this example, the initiator 1511 at the feeder SOI selects a distributed generation data collection agent to perform the desired task (e.g., an agent for collecting 5-minute power outputs of photovoltaic panels in a neighborhood). The code for the agent can be cryptographically signed by its creator at creation time. As part of the agent creation, the creator can also define the resources, such as the processing and memory required for the agent to execute the task, and attach the execution requirements to the agent code. The execution requirements are sometimes referred to herein as the "resource requirements" or the "agent execution contract proposal." The initiator 1511 checks the cryptographic signature for the agent either periodically, or during the agent dispatch process. In order to dispatch the agent, the initiator 1511 determines the devices on the feeder 1512 (e.g., the intelligent sensors at homes 1520, 1522, 1524) and provides the path information to the agent. The determination of the path and the devices on the feeder 1512 can be accomplished by consulting a directory service module. The directory service module can retrieve the path information either by an automated discovery process performed by tasking and transmitting a discovery agent, or by consulting a topology and configuration database (assembled, for example, as a result of the earlier use of a discovery agent).

The initiator 1511 then constructs the agent transport payload. In certain exemplary implementations, the agent transport payload comprises the initiator's identification, the creator's identification, the configuration data for the agent (including its path (comprising a list of one or more destination nodes) and task configuration parameters (comprising parameters set by the initiator for the particular task to be performed by the agent), and an empty data container that the agent uses to store its data as it is sent to one or more destination devices (sometimes referred to as the "mutable data container"). Note that the data container can grow as the agent performs its task. The agent transport payload can also include data identifying the current source (the sending host, which in this case is the initiator node) and, optionally, the next destination host (e.g., the next destination node on the path) of the agent.

One or more of the components of the agent transport payload can be cryptographically signed by the creator, the initiator, and/or the current host (which may be the initiator). For example, a hash of the agent code and/or the creator identification information can be cryptographically signed by the creator. Further, the initiator 1511 can cryptographically sign a hash of the combination of configuration data, initiator identification information, creator identification information, and/or agent code. Additionally, the source node (or sending node), which for the initial hop is the initiator, can also fill in the source information (and optionally the next destination information) and sign the entire payload with a further cryptographic signature.

The initiator 1511 then transfers the agent transport payload to a network services interface for transmission on the network 1514 to the first destination (illustrated as first "hop" 1530 to home 1520). The network packets may further be protected during transmission by cryptographic means, such as IPsec or SSL. The network will transport the agent transport payload to its destination. In certain implementations, if the agent transport payload is larger than the maximum transmission unit of the network, the agent transport payload will be fragmented and re-assembled by the network layer.

At the destination device, the agent transport payload is received and processed. In the illustrated example, the destination device is the intelligent sensor at home 1520. For example, the destination device can verify the source and path information by checking the cryptographic signature of the agent transport payload. If the payload is not verified, then it will be discarded (and, in certain embodiments, a security violation event is logged). If the payload is verified, the agent instantiation process will begin.

In one exemplary embodiment, the agent instantiation process comprises one or more of the following acts. The destination device (which also operates using an agent-based software platform compatible with or the same as the platform used by the initiator) identifies the identity of the initiator (e.g., by parsing the agent transport payload and identifying the identity of the initiator). The destination device authenticates the initiator and the source, verifies that the initiator is an authorized initiator for the device's SOI, and verifies that the source of the agent is the prior node in the path. The destination device verifies that the configuration data has not been tampered and verifies that the mutable data container was not changed during transport (e.g., by using the one or more hashes sent with the agent transport payload). The destination device extracts the agent execution contract template sent with the agent transport payload and verifies that sufficient resources exist to ensure successful execution of the agent. If the checks above succeed, the destination device passes executable agent code and data to an agent execution environment associated with the destination device. In particular implementations, parts of the agent transport payload signed by the creator and by the initiator are immutable during the movement of an agent. Therefore, the associated immutable agent data is desirably preserved to ensure that the agent can move to a next destination device (e.g., a next hop to a next destination node).

The destination device then executes the agent code so that the agent completes its task on the device and collects the requested information. In particular implementations, the collected data is stored in the mutable data container and travels with the agent. In certain implementations, the mutable data container is cryptographically signed at each hop by the source (sender) of the agent transport payload.

Once the requested data is collected and stored at a destination device, the agent will request movement to its next hop based on its path (which can be part of the immutable configuration data in the agent transport payload). In the illustrated example, the next hop is second hop 1532 to the home 1522.

In certain implementations, the agent transport payload is recreated in the same fashion as when the agent transport payload was created by the initiator, but the mutable data container and the outer parts of the payload are signed by the source device (e.g., the node on the network that is sending the agent to its next destination node). At the next destination device (e.g., at home 1522), the process described above will be repeated until all destination devices have been reached. For example, in FIG. 15, a final hop 1534 to home 1524 is illustrated. The agent will then be sent back to the initiator. For example, in FIG. 15, a returning hop 1536 from the home 1524 to the initiator 1511 is illustrated.

When the agent is received by the initiator 1511, the initiator will verify the source, destination, and the mutable data container as described above. The initiator 1511 will also verify the remaining immutable segments of the agent transport payload to (once again) confirm that the agent has not mutated during its travels. If all of the checks succeed, the initiator will extract the desired information from the mutable data container, thus completing the agent lifecycle.

4. Agent Movement and Tasking Between SOIs

In this section, an exemplary scenario in which a parent SOI tasks an agent to perform a task on a subset of its child SOIs is described. In the exemplary scenario, an initiator at a substation SOI dispatches an agent to perform a software update to all devices in a feeder SOI. In this case, the initiator will dispatch the software update agent to the initiator of its child SOI using a procedure substantially similar to that described in the previous section (Section III.B.3). In this case, however, because the original initiator of the task belongs to a different SOI, the receiving SOI's initiator will check the authentication and authorization of the sending SOI as part of its policy check. Additional details concerning exemplary embodiments of the described agent authentication and authorization process are discussed in more detail below at Section IV.D.5 and with respect to FIG. 12.

One exemplary method for authenticating and authorizing the agent comprises the following method acts, which can be performed alone or in various combinations and sub-combinations with one another. When the initiator in an SOI receives an agent from another SOI (e.g., from its parent SOI), the initiator authenticates and authorizes the agent as described in the previous section (Section III.B.3). This is possible because logically the initiator in an SOI participates in one or more trust relationships with other SOIs. Once the agent is authorized, the initiator of the SOI adds an immutable data container that contains the authorization and authentication credentials of the original initiator of the agent. The initiator of the SOI can further sign these credentials to ensure that the devices within that SOI will trust the new agent. The initiator can then send the agent to the first device on its path using the procedure described above in the previous section (Section III.B.3).

5. Exemplary Stationary Agent and Agent Upgrade Scenario

A stationary agent is an agent that remains on a single device and does not move once deployed. Stationary agents can be upgraded by means of pushing new agent code onto the system to replace an existing agent. Because the agent in this scenario is stationary, there are times when the agent will need to be upgraded to enhance its functionality or to improve existing functionality. Additional details concerning exemplary embodiments of the described agent update process are discussed in more detail below at Section IV.D.4 and with respect to FIG. 11.

One exemplary procedure for upgrading a stationary agent comprises one or more of the following method acts, which can be performed alone or in various combinations and subcombinations with one another. The device with the agent being upgraded receives and validates the agent transport payload (e.g., using the process described above in Section III.B.3). The agent transport payload is evaluated to determine if it is an upgrade for an existing agent running on the device platform. If the payload comprises an update, the currently executing agent is notified that an upgrade is in progress. The currently executing agent can then take a snapshot of its state (e.g., by storing information indicative of its current state) and terminate. If the currently executing agent does not support upgrade-in-place functionality, then the device platform can terminate the agent. The new agent code can then be made available to the agent execution environment, and the agent execution environment will execute the new agent. If the agent supports upgrade-in-place functionality, the upgraded agent will restart from its last-saved state; otherwise, the upgraded agent will restart with a clean data store.

6. Runaway Agent and Reputation-Based Trust Enhancements

In certain embodiments of the disclosed software framework, before an agent is instantiated on a platform, the agent presents its "agent execution contract proposal" (discussed above in Section III.B.3). The agent execution contract proposal comprises data indicating the execution resource requirements for the agent. A resource monitor associated with the device executing the agent can be used to validate the requirements presented by the agent and to generate data indicating that the resources are available on the device, thus "agreeing" to the proposal (this action can be conceptually viewed as the agent creating a binding contract between the platform and the agent). The agent (if desired by the creator of the agent) can then monitor the allocated resources. If the agent detects a violation of the agreed-upon resource requirements (conceptually, a violation of the contract), the agent can log an event and/or use an interface provided by the resource monitor to trigger a readjustment of the platform resources. The resource monitor associated with the device can also monitor the utilization of the platform resources by all agents operating on the platform.

If the resource monitor detects an agent that is exceeding its agreed-upon resource requirements, the resource monitor can respond. For example, in one particular embodiment, an agent can be determined to exceed its resource allocation limit if it exceeds the limit for a set period of time. The resource monitor can send the agent a message (e.g., a data message indicating that the agent is in violation of the resource allocation limit) through the platform and to the agent execution environment. The resource monitor can then start a timer to track the agent response. When the tracking timer expires, and the agent has not responded, the resource monitor will notify the agent execution environment to terminate the agent. The resource monitor can then restart the tracking timer. If the tracking timer expires and the agent execution environment has not responded, the resource monitor can terminate the agent through operating system level mechanisms (e.g., a "force quit" mechanism).

One possible advantage of having control over the trust mechanisms in the agent-based software platform is that reputation-based schemes can be utilized to propagate information about unreliable or faulty agents within an SOI or through the entire system. For example, if an agent repeatedly fails to honor the agent execution contract, due to malicious intent or a software bug, this information can be sent back to the initiator of the SOI. The initiator can then stop tasking this agent, and the information can also be sent back to the creator of the agent as well.

C. Capabilities of and Considerations for Embodiments of the Disclosed Software Platform This section describes some of the capabilities that can be realized in embodiments of the disclosed technology and also describes some of the hardware, software, and networking considerations that are involved in implementations of the disclosed technology.

Although some of these functions and/or capabilities may not be feasible for some devices in the power system, the examples described below illustrate possible functions and capabilities that can be realized using embodiments of the disclosed technology. Additionally, due to long equipment replacement cycles in the power industry, it may not be feasible to upgrade all older equipment quickly to enable some or all of the described functionality.

To help accelerate the deployment of intelligent sensors in the power grid and to help realize at least some of the described functionality, one or more proxy devices can be coupled between legacy devices (e.g., legacy sensors) and control applications in order to provide at least some of the enhanced functionality described. This proxy device is sometimes referred to herein as an "intelligent sensor aggregator" ("ISAg").

1. Hardware

In order for embodiments of the disclosed technology to be flexible and capable of implementation across a wide variety of hardware platforms, the hardware requirements for the software platform used to implement the representative framework are desirably not highly demanding. Even so, there may be instances of legacy hardware that are not capable of running the software platform for the representative framework. For devices that are not capable of accommodating the agents, an ISAg device can act as a proxy platform and still enable the desired functionality that is required.

The hardware used to implement embodiments of the disclosed software platform (e.g., the hardware used at sensors or controllers in the power system) can be separated into the central processing unit ("CPU"), memory, storage, and inputs/outputs. For CPUs, and according to one exemplary embodiment, a memory management unit ("MMU") that supports virtual memory, paging, and process memory segmentation is used. These MMU capabilities are not very strict, since in the last several years embedded microprocessors from many CPU families (e.g., ARM, PPC, x86) have all gained an MMU. One benefit of an MMU in an embedded device is the ability to support memory isolation and segmentation between different processes running on the CPU. This enables different agents running on the system to be isolated from each other and improves the cyber security of the platform.

The memory (e.g., RAM) located on a device used in the power system can be relatively small compared to what is commonly used in consumer applications. For instance, in some non-limiting examples, devices with 256 MB or more memory can be used, although embodiments of the disclosed software platform can be sized down to lower memory sizes as well. Further, in certain non-limiting exemplary embodiments, the devices have at least 128 MB of non-volatile storage, though the embodiments of the disclosed platform can operate using devices with less storage as well. Typically, in control systems, flash memory is used and the operating system is aware of wear associated with flash memory when information is written to the same sectors repeatedly.

A sensor or controller can have many inputs and outputs. Embodiments of the disclosed software platform can be used with sensors or controllers having any number inputs and outputs. An ISAg can have many serial and networked inputs. Since the sensors or controllers are assumed to be networked, the sensors or controllers used with the disclosed software platform will typically have at least one wired or wireless network interface.

2. Operating System

Embodiments of the disclosed software platform can operate using a wide variety of operating systems. For example, in particular non-limiting examples, and given the memory, storage, and CPU capabilities of devices that are present in the power system, the operating system is desirably capable of running on devices with a memory of 256 MB or more and reserves 128 MB or more of memory for the agent framework for agents. In other embodiments, the operating system is implemented on devices with less memory.

3. Diagnostic and Manageability Considerations

Embodiments of the disclosed software framework allow for improved diagnostics and management. For example, agents can be dispatched to collect data as they move through the system and can then carry that data back to a management station. Embodiments of the disclosed software platform are capable of managing the activities of multiple hosted agents (e.g., all hosted agents) in the system. This management function can include, for instance, stopping, restarting, or banning any agent deployed in the system.

4. Information Sharing

In certain embodiments of the disclosed software platform, the agents used in the power grid are capable of accomplishing tasks that would normally require large amounts of communication if implementing using a centralized system. In order to limit the amount of information being communicated across wide portions of the system, "scopes of influence," as introduced above, are used to create communication boundaries between groups of sensors and their associated agent initiators. Further, the communications that occur in such a "scope of influence" are secure and reliable. In certain embodiments, the sensors and/or controllers may be further divided into sub-groups (sometimes referred to as "task groups") that are task based. For example, sensors and/or controllers collaborating on accomplishing load sequencing may belong to a "load sequencing" task group. An example method of performing load sequencing is described below with respect to FIGS. 13A-B.

5. Runtime Environment

As noted above, the software agents used in embodiments of the disclosed software framework can be stationary or roam between sensors and/or controllers in the system. Agents are task driven and can be used to accomplish a task that involves many sensors and/or controllers. Certain embodiments of the disclosed technology exhibit one or more of the following features: (1) agents are capable of running on multiple CPU architectures as long as agent resource requirements are met (the agents operate with a runtime environment that is independent of the underlying CPU architecture); (2) the agent framework is able to determine whether it has the capabilities to support a particular agent; (3) the agent framework is able to determine if the agent requesting "hosting" is authorized to execute on that platform; (4) the agent framework is able to determine if the agent code has been tampered with; (5) the agent framework allows agents to store information on-board; (6) the agent framework provides access to information collection and dissemination services for the agent; (7) the agent framework is able to allocate (e.g., stochastically) a requested slice of its resources such as memory, storage, processor cycles to an agent; (8) the agent framework is able to detect and terminate an agent that is not behaving according to its agent/platform contract; (9) the agent framework is able to collect and transmit an inventory of agents hosted by the platform; (10) the agent framework can implement a "liveness" check for each agent hosted on the platform in order to detect and terminate malfunctioning agents; and/or (11) the agent framework can provide a protected environment for each agent (e.g., including memory and storage protection).

6. Configuring, Changing, and Updating Agents

Embodiments of the disclosed software platform allow for agents to be easily configured, changed, and updated. For example, if smart meter data collection is implemented as an agent, the metrology agent can be updated using embodiments of the disclosed technology without needing to perform a costly and time consuming monolithic firmware upgrade for the entire platform image. A new version of an agent can simply be dispatched by means of an update agent that moves through the system. An update agent can also perform configuration and change management duties. To enable such functionality, embodiments of the disclosed software platform use a well-defined interface for agents such that an agent can be upgraded without needing a complete software update for the entire platform.

7. Security and Robustness

The sensors and controllers in a power system are networked devices. In order to allow the sensors and controllers in the system to be able to share information securely, certain embodiments of the disclosed agent-based software framework exhibit one or more of the following features: (1) the agent framework validates agent software as part of the instantiation process; (2) the agent framework periodically validates the software to detect tampered executables if the software framework resides in modifiable storage; (3) the agent framework locks certain memory locations as read-only once the boot process is completed (this may include all cryptographic and authentication libraries and be performed using capabilities in the operating system); (4) the agent framework detects resource exhaustion (either malicious or due to defective software) and take corrective action; (5) for battery operated platforms, the software platform detects behavior that causes battery exhaustion and take corrective action; (6) the agent framework is resilient against misfiring interrupts and can mask a misfiring interrupt (e.g., using interrupt handling mechanisms in the operating system); and/or (7) the agent framework offers memory protection to hosted agents (e.g., using memory protection capabilities in the operating system).

Additionally, in certain implementations of the disclosed technology, the networked devices desirably handle incoming network traffic at the full data rate supported by their interfaces. For example, a sensor that has a 100 Mbps IEEE 802.3 Ethernet interface desirably receives packets at or near that full rate without crashing or hanging. Further, the device hardware used in certain embodiments of the disclosed technology includes interfaces that communicate with the agent framework and are used to implement a physical tamper detection warning system that generates an event when physical tampering is detected by tamper detection circuitry.

Additionally, some embodiments of the disclosed technology are adapted to satisfy the authentication, authorization, and accounting ("AAA") requirements as discussed in Stouffer, K., et al., "*Guide to Industrial Control Systems ('ICS') Security, Technical Report Special Publication*," NIST, 800-82 (2008), as well as requirements for communication protocols security. Additional cyber security requirements that can be met in certain embodiments can be found in Smart Grid Interoperability Panel Cyber Security Working Group, "Guidelines for Smart Grid Cyber Security," NIST IR 7628 (2010).

Figure 3:
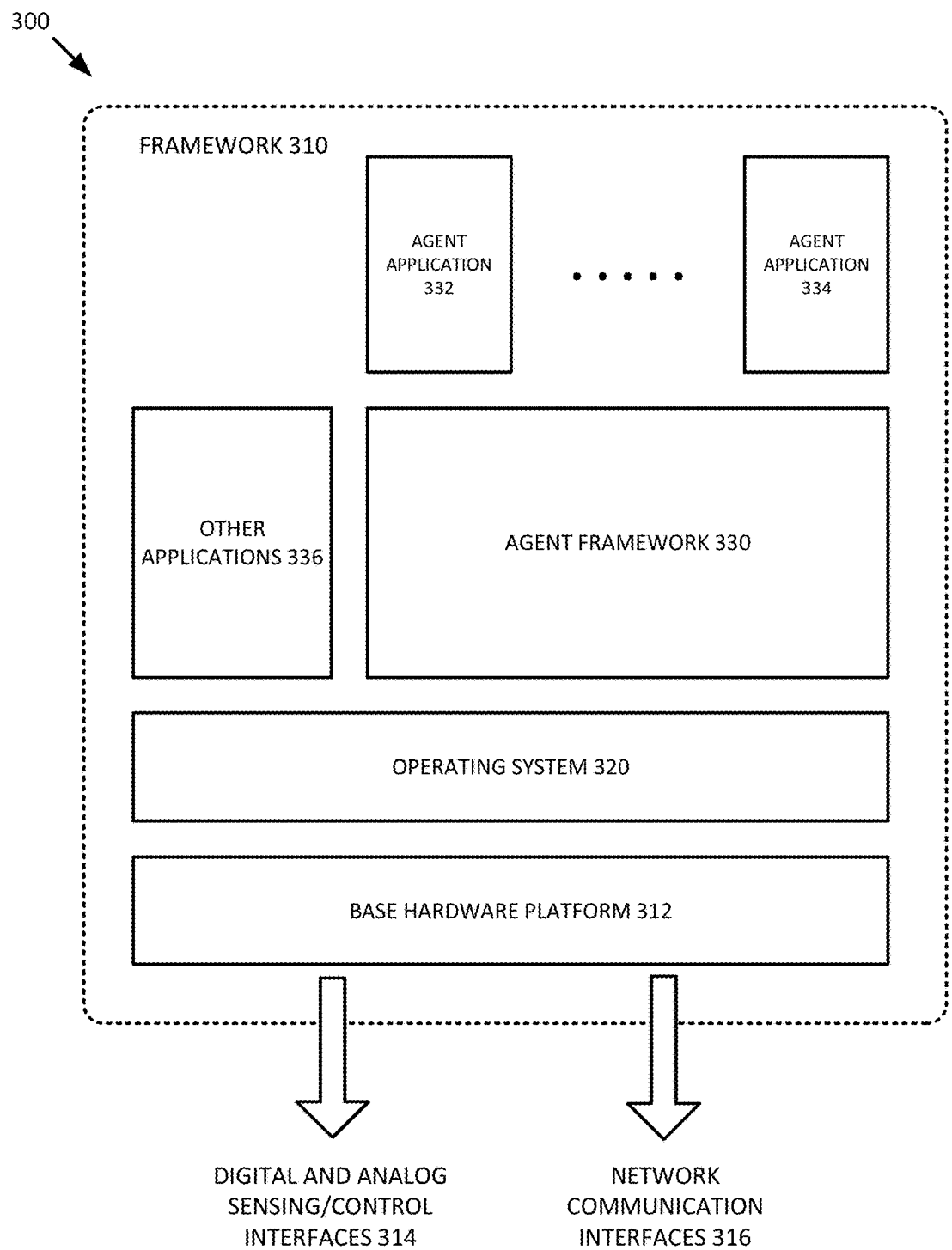
FIG. 3 is a schematic block diagram illustrating an overall architecture of an exemplary software framework in embodiments of the disclosed agent-based system.

IV. Detailed Description of Exemplary Software Frameworks and Methods for Using Agents A. Overview of Software Platform Components FIG. 3 is a schematic block diagram 300 showing a generalized view of a hardware/software framework 310 that can be used in embodiments of the disclosed technology. In particular, the framework 310 can be used to implement any of the intelligent sensors, controllers, and/or initiators in the system. In particular, the framework 310 comprises a base hardware platform 312 that comprises the hardware resources for implementing the software platform and is further coupled to digital and/or analog sensing/control interfaces 314 (e.g., for receiving data sensed at the sensor) and network communication interfaces 316 (e.g., for communicating with the initiator and sensors in the network). An operating system 320 is optional, as certain runtime environments can run directly on hardware without the need of an operating system. Agent framework 330 is executed on the base hardware platform 312 (optionally in conjunction with the operating system 320). The agent framework 330 is the main runtime environment for the agents. Exemplary embodiments of the agent framework 330 are described below as framework 400 and framework 500. One or more agent applications (such as applications 332, 334) run using the agent framework 330. In particular embodiments, other applications 336 can also be executed on the base hardware platform 312.

Figure 4:
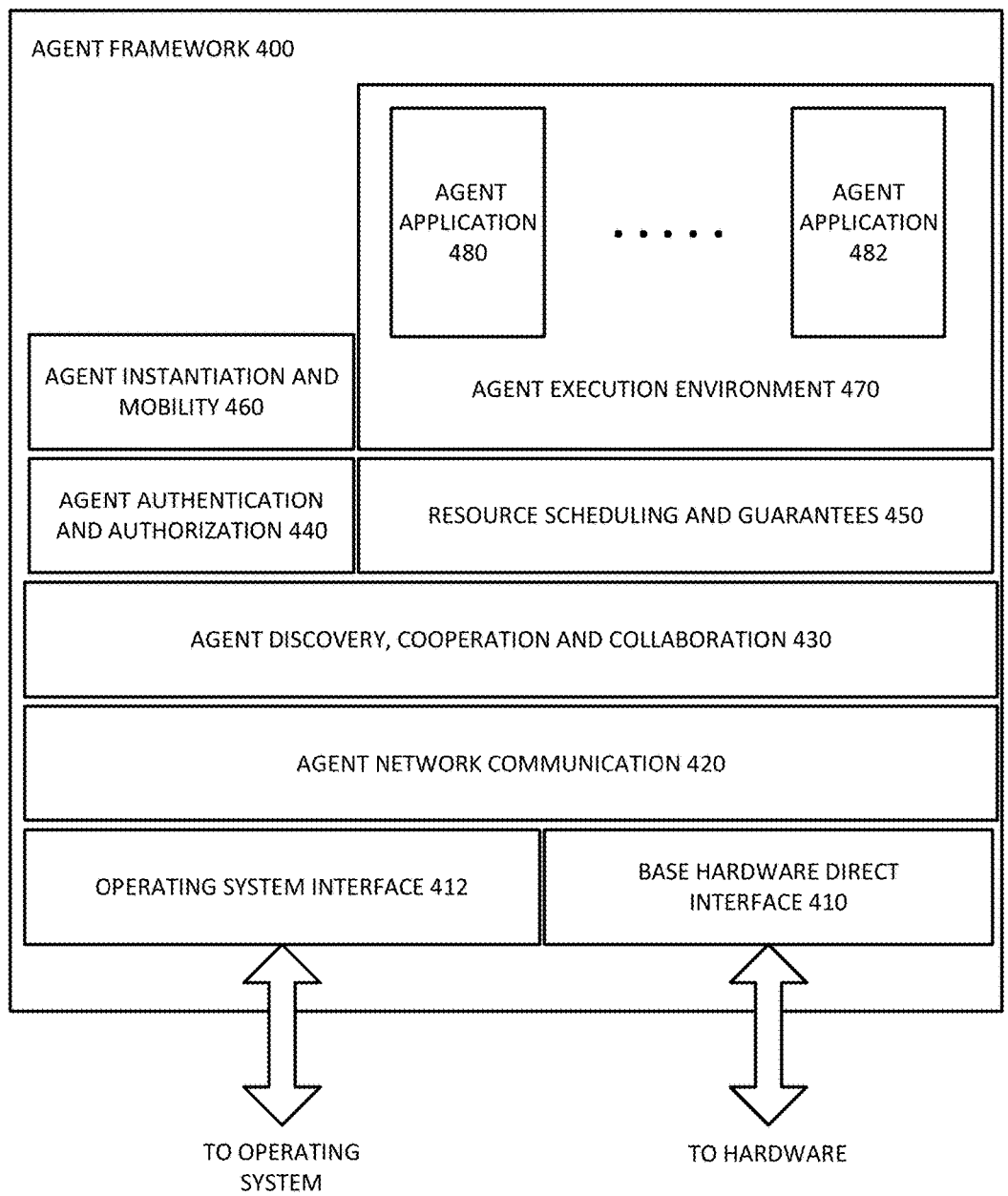
FIG. 4 is a schematic block diagram illustrating components of an exemplary intelligent sensor or controller agent framework used in embodiments of the disclosed agent-based system.

FIG. 4 is a schematic block diagram showing internal components of an exemplary intelligent sensor or controller agent framework 400. The framework 400 can be used as the agent framework 330 in FIG. 3. The schematic block diagram of FIG. 4 illustrates the components as a series of layers. At the base layer, a hardware direct interface 410 allows the framework to run directly on top of hardware, and an operating system interface 412 allows the framework to operate as a module inside an operating system. Agent network communication layer 420 provides a network communication interface, including the necessary cyber security functions for data transport. Agent discovery, cooperation, and collaboration layer 430 allows the agents executing in the framework 400 to discover other agents, exchange information securely, and cooperate to accomplish tasks. Agent authentication and authorization layer 440 validates that an agent is authorized to execute on the sensor or controller and that the agent has not been tampered with during transit. In particular embodiments, the authentication and authorization of the agent is performed by consulting with a resource scheduling and guarantees layer 450. The resource scheduling and guarantees layer 450 determines whether the platform has sufficient resources to accommodate this agent. Agent instantiation and mobility layer 460 supports movement of agents between devices. Agent execution environment 470 provides all other services that allow an agent to accomplish its tasks. One or more agent applications (such as agent applications 480, 482) operate in the agent execution environment 470.

Figure 5:
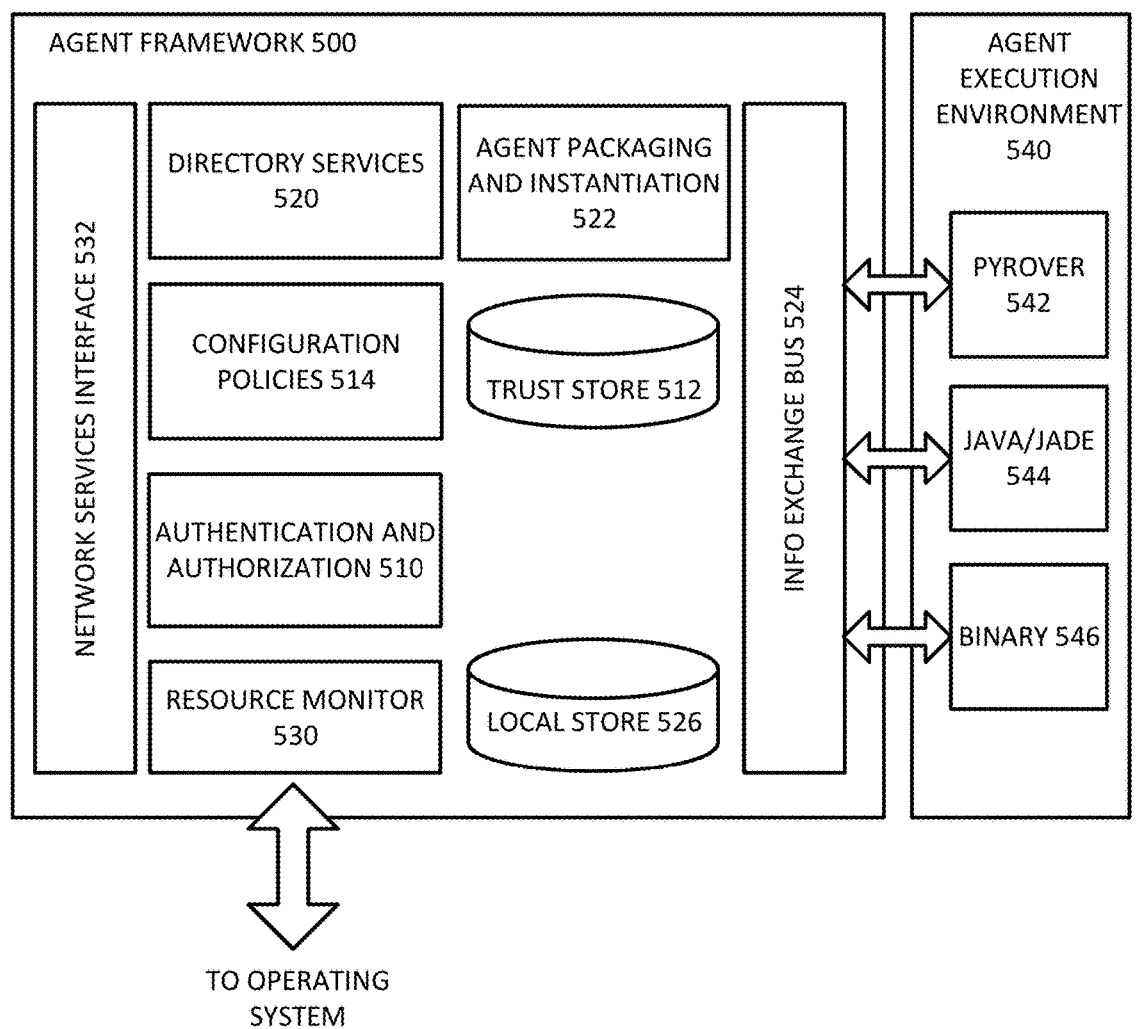
FIG. 5 is another schematic block diagram illustrating components of an exemplary intelligent sensor or controller agent framework used in embodiments of the disclosed agent-based system.

FIG. 5 is another schematic block diagram showing internal modules of an exemplary intelligent sensor or controller agent framework 500. The modules illustrated in framework 500 serve to implement the functionality of the layers illustrated in framework 400. The modules in FIG. 5 can be categorized as either external facing (interfacing with components outside of the framework), related to security, related to agent support, or related to agent execution.

In particular embodiments, authentication and authorization module 510, trust store module 512, and configuration policies module 514 represent the security-related modules. Network services interface 532 and resource monitor module 530 represent external facing components. Directory services module 520, agent packaging and instantiation module 522, information exchange bus 524, and local store 526 represent agent support modules. Agent execution environment 540 and its sub-components represent modules related to agent execution.

In certain exemplary embodiments, the authentication and authorization module 510 validates that an agent is authorized to execute on the device and that the agent has not been tampered with during transit. The agent can be authenticated, for example, using a public key pair (e.g., an X.509 public key pair). For instance, in particular embodiments, SOI administrators, initiators, and creators each have a public key. In certain implementations, the possible hosts in the system also have respective public keys. Further, the public keys can be stored in the SOI-level trust store module 512. The trust store module 512 can operate as a whitelist, meaning that keys will only be present for entities for which interaction is approved by the SOI administrator. The public keys can also be marked for expiration. In certain embodiments, possible hosts in the system (e.g., all possible hosts across the system or in the local SOI) are stored in a directory service module 520, which can be accessed by the authentication and authorization module 510. Further, in particular embodiments, the SOI administrator can store an authoritative policy (e.g., describing all authorized agent interactions) as part of the configuration policies module 514.

In certain exemplary embodiments, the trust store module 512 interacts with an SOI administrator in the following manner. If a public key for an SOI administrator, agent initiator, agent creator, or other entity to be verified cannot be found in the local trust store (e.g., in the trust store module 152), then a request to the SOI administrator is made to retrieve it. If the public key is not in the SOI administrator's trust store, the SOI administrator requests it from one or more of its peer SOI administrators, a utility company having authority over the SOI administrator, and/or a balancing authority with certificate authority. An agent initiator can be given the SOI administrator's public key upon startup, and the local SOI administrator is trusted once authenticated.

During agent instantiation (performed by agent packaging and instantiation module 522), the authorization and authentication module 510 performs one or more of the following services: (1) verifying that the configuration data has not been tampered with; (2) verifying that the mutable data container has not been changed during transport; (3) verifying that the immutable container (including the agent code) has not changed during transport or prior execution; (4) if the SOI of the agent is not the local SOI, verifying the identity, reputation, and authorization of the SOI administrator (e.g., by checking whether the SOI administrator signature matches a public key in a local cache (such as a local trust store 512), checking whether the SOI administrator is trustworthy (by checking data stored in the local trust store 512), and/or checking whether the SOI administrator's agents are allowed to be considered for running in the local SOI (by checking data stored in the local trust store 512); (5) verifying the identity, reputation, and authorization of the agent initiator (e.g., by checking whether the agent initiator signature matches a public key in a local cache (such as the trust store 512), checking whether the agent initiator is authorized to dispatch an agent to the device (by checking data stored in the local trust store 512), and/or checking whether the agent initiator is trustworthy (by checking data stored in the local trust store 512)); (6) verifying the identity, reputation, and authorization of the creator (e.g., by checking whether the agent creator signature matches a public key in a local cache (such as the trust store 512), checking whether the agent creator is authorized to create agents of this type (by checking data stored in the local trust store 512), and/or checking whether the agent creator is trustworthy (by checking data stored in the local trust store 512)); (7) verifying the authorization of the agent (e.g., by verifying that agents of this type are allowed to run within this SOI by checking the configuration policy to determine whether the policy (a) permits the desired agent execution; (b) permits the desired agent execution from the SOI from which the agent was sent; (c) permits the desired communication with other agents, if any, in the SOI; and/or (d) permits the desired communication with other agents, if any, in other SOIs).

During agent tasking, the authorization and authentication module 510 performs one or more of the following services: (1) verifying the cryptographic signature; and/or (2) checking the reputation of hosts on the proposed agent path. Once agent tasking is complete, the authorization and authentication module 510 can also update reputation data for hosts, initiators, and SOIs.

The authorization and authentication module 510 can perform its function using a wide variety of security technologies (e.g., the Cryptographic Trust Management system available from Pacific Northwest National Laboratories (see, e.g., T. W. Edgar, "Cryptographic Trust Management Requirements Specification," version 1.1, PNNL-18744 (September 2009)), X.509 certificates, SAML, IPsec, PGP, and the like), trust technologies (e.g., reputation tracking and trust negotiation technologies), and/or policy languages and technologies (e.g., XACML and SPARQL). Example encryption technologies that can be used by the authorization and authentication module include RSA, ECC, AES, and/or PGP.

In certain exemplary embodiments, the configuration policies module 514 is operable to store the policies for what agents are allowed to do at the particular intelligent sensor or controller implementing the framework 500 and to store the allowable actions of the framework 500. The policies for what agents are allowed to do can be based on the reputation of the agent and/or the sensitivity of controls available at the intelligent sensor or controller. In certain embodiments, the configuration policies modules 514 can be called by, for example, the authorization and authentication module 510 and the agent packaging and instantiation module 522 to determine if an agent has permission to perform desired actions.

In certain exemplary embodiments, the agent packaging and instantiation module 522 is operable to allow a message body to be passed to the agent execution mechanism of each agent environment in the agent execution environment 540. For agents moving between platforms, the agent packaging and instantiation module 522 can intercept the normal mechanism, packaging the agent up instead of allowing it to move on its own. In certain embodiments, the agent packaging and instantiation module 522 is called by the agent execution environment 540 through information exchange bus 524 when an agent is ready to be sent from the framework 500 to it next destination node. The network services interface 532 can also send messages from other platforms to the agent packaging and instantiation module 522 for agents moving onto the framework 500.

In certain exemplary embodiments, the information exchange bus 524 serves as the agent execution environment interface and is operable to: (1) allow agents in different environments (e.g., a Python agent environment 542, a JAVA agent environment 544 (such as JADE (Java Agent Development Framework), and/or a binary agent environment 546) to communicate with each other; (2) allow agents to communicate with agents on other platforms; (3) allow the framework 500 to communicate with its agents; and/or (4) receive information from resource monitor 530 indicating that a misbehaving agent in one of the environments is to be shut down. In certain embodiments, the information exchange bus 524 can be called by the agent packaging and instantiation module 522, the network services interface 532

(which can send put messages for receipt by the packaging and instantiation module 522), the resource monitor 530 (which can send shutdown notice for the agent execution environment 540), and/or the agent execution environment 540 (which can send messages for other agent or mobility requests).

In certain exemplary embodiments, the resource monitor module 530 is operable to: (1) help ensure that agent threads do not consume more resources than their contract asked for; (2) shut down misbehaving threads; and (3) utilize operating system level thread monitoring and control. In particular embodiments, the resource monitor module 530 is called by the agent packaging and instantiation module 522 (which can send messages to the resource monitor module 530 to determine if there are sufficient resources to satisfy an agent contract) and calls into the information exchange bus 524 to shutdown an agent consuming too many resources.

In certain exemplary embodiments, the local data store module 526 is operable to store local information both about the framework 500 (e.g., which operates as a node in the power system) and persistent information from agents running at the node. In particular embodiments, the local data store module is called by the information exchange bus 524 when an agent wants to store or read longer term information and/or any other module in the framework 500 requesting data to be stored.

In certain exemplary embodiments, the directory services module 520 is operable to maintain a list of other platforms, agents, and agents by service provided. In particular embodiments, the directory services module 520 is called by the agent packaging and instantiation module 522 in order to look up the location of a node an agent wishes to move onto or of a node to which an agent wishes to deliver a message.

In certain exemplary embodiments, the network services interface 532 is operable to receive information that comes in from the network and route the information to the information exchange bus 524. The network can be implemented as a Local Area Network ("LAN") using wired networking (e.g., using the Ethernet IEEE standard 802.3 or other appropriate standard) or wireless networking (e.g. using one of the IEEE standards 802.11a, 802.11b, 802.11g, or 802.11n or other appropriate standard). Furthermore, at least part of the network can be the Internet or a similar public network. In particular embodiments, the network services interface 532 is called by an external application or platform (e.g., another node in the system operating with its own instance of framework 500). The network services interface can call into information exchange bus 524 (to send message to be picked up by the agent packaging and instantiation module 522).

In certain exemplary embodiments, agent execution environment 540 is operable to provide one or more specific execution environments in which an agent will run (e.g., a Python agent environment 542, a JAVA agent environment 544 (such as a JADE (Java Agent Development Framework), binary environment 546, and/or any other agent environment (such as JINI, Cougaar, Lua, C++, Squawk, and the like). This allows agents written in different languages to be executed using embodiments of the disclosed software platform. Further, the agents can be written in their native language and do not require any translation to a common agent environment. The agent execution environment 540 can be implemented in part as a plugin or daemon that subscribes to agent instantiation requests from the agent packaging and instantiation module 522 via the information exchange bus 524 (e.g., on receiving a request, the agent execution environment 540 can create an instance of the environment for that agent or add that agent to an existing, compatible environment). In particular embodiments, the agent execution environment 540 is called by the agent packaging and instantiation module 522 via the information exchange bus 524.

The agent execution environment 540 can be controlled by components in the agent packaging and instantiation module 522. For example, an agent execution environment manager ("AEE manager") can be part of the agent packaging and instantiation module 522. After validation and resource checking has been completed by the agent packaging and instantiation module 522, the AEE manager can determine the agent execution environment needed by the agent. For example, for a JADE agent, the AEE manager can: (1) create a JADE main container; (2) create a JADE manager class which creates the main container; and/or (3) publish a message that an agent wants to move onto the JADE AEE. The JADE main controller is operable to listen for JADE agent requests. When a JADE agent request is received, if no main container has been created, the JADE manager can create one. In order to maintain control, the main container is desirably not a separate process. In particular implementations, the JADE main container is part of and started by the JADE controller. Further JADE containers can join the JADE platform maintained by this main container. In general, a JADE container is created as a place for JADE agents to reside and can be started as a separate process for agents moving onto the platform. The JADE container can point to the main container. In some implementations, however, outside agents are not run on the main container in case they need to be terminated.

B. Overview of Components of the Agent Transport Payload

Figure 6:
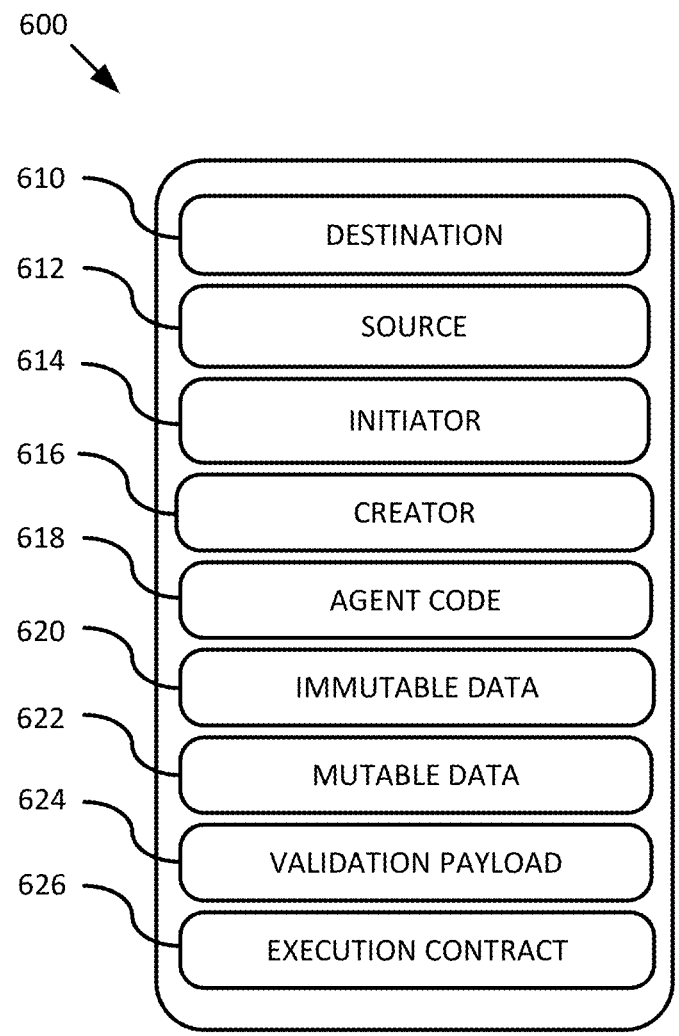
FIG. 6 is a schematic block diagram illustrating components of an exemplary agent transport payload for agents used in embodiments of the disclosed agent-based system.

FIG. 6 is a schematic block diagram illustrating the agent transport payload 600 (e.g., the data that is transported with an agent) for an exemplary agent implemented according to the disclosed technology.

Agent transport payload 600 includes destination identification data 610, source identification data 612, initiator identification data 614, creator identification data 616, agent code 618, immutable data 620 (sometimes referred to as "immutable luggage"), mutable data 622 (sometimes referred to as "mutable luggage"), validation payload data 624, and execution contract data 626. In particular embodiments, one or more of the data components of the payload 600 (alone or in any combination with one another) are signed by the entity that was responsible for the data. For instance, in particular embodiments, the destination identification data 610, source identification data 612, and mutable data 622 are signed by the most recent host (or node) that handled the agent transport payload 600 and forwarded it to the current host; the initiator identification data 614, the validation payload data 624, and the execution contract data 626 are signed by the initiator (e.g., the initiator node that originally assigned and transmitted the agent onto the network); and the creator identification data 616 and the agent code data 618 are signed by the creator (e.g., the entity that originally created the agent, such as the utility or utility vendor). Hashes for one or more of the data components are also included as part of the cryptographic signatures in the agent transport payload 600.

In the illustrated embodiment, the destination identification data 610 comprises data identifying the node the agent is moving onto. The source identification data 612 comprises data identifying the node the agent is moved from. The initiator identification data 614 comprises data identifying the host (or node) that instantiated the agent. In general, the initiator is responsible for setting the available task configuration parameters for the agent, but does not modify the original code of the agent. The creator identification data 616 comprises data for identifying the entity that created the agent (e.g., the entity that wrote the original code for the agent, which is typically the utility or a vendor for the utility). The creator typically does not instantiate the agent (e.g., by setting its configuration parameters, setting its delivery paths, and sending the agent) but instead writes the original code for the agent, which is then used by initiators in the network. The agent code 618 comprises the executable code that when executed performs the desired task for the agent (e.g., the data comprises the actual byte code for the agent that is executed, for instance, by the agent execution environment of the platform). The immutable data 620 comprises any task configuration parameters that are used to instantiate and properly run the agent (e.g., the agent path, initial data, initial payloads, and the like). The data is termed "immutable" because it does not (or cannot) change during the lifecycle of the agent. Further, the data container for the immutable data 620 can be referred to as the immutable data container. The mutable data 622 comprises current state, data, or payloads that the agent uses to perform its task. The data is termed "mutable" because it can be changed and is typically changed at every node at which the agent stops. Further, the data container for the mutable data 622 can be referred to as the mutable data container. The validation payload data 624 comprises data that is used to validate that the agent is authentic and authorized to perform its desired actions. The validation payload 624 can include a code checksum, credentials, hashes, and the like. The execution contract data 626 comprises data indicating the "contract" the agent makes with the platform it is moving onto. More specifically, this data can include an identification of the resources (e.g., memory and CPU) required to execute and the actions it wishes to perform. Furthermore, in certain implementations and even though the creator initially defines the resource requirements, the initiator confirms the resource requirements needed and modifies them as necessary when it sets the configuration parameters for the agent. In use, the resource components of the execution contract data 626 can be used by the resource monitor (e.g., resource monitor module 530) while the actions component can be used by the configuration policy module (e.g., configuration policy module 514).

C. Agent Operation Overview

Figure 7:
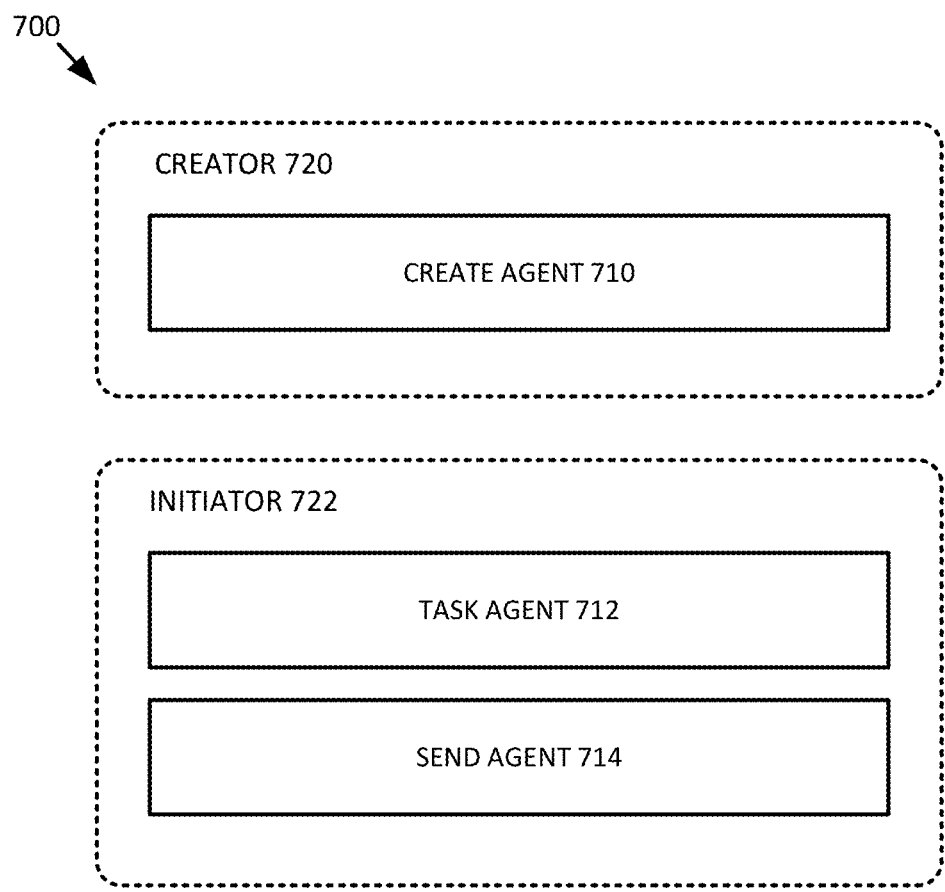
FIG. 7 is a schematic block diagram illustrating exemplary basic agent operations performed by a creator and an initiator in embodiments of the disclosed agent-based system.

FIG. 7 is a schematic block diagram illustrating an exemplary method of creating, tasking, and dispatching an agent. The method acts illustrated in FIG. 7 can be performed by a single entity (e.g., using a single computer) or by multiple different entities (e.g., a creator 720 that is separate from the initiator 722, as illustrated). At 710, an agent is created. For example, the executable agent code can be written and signed by a creator 720. The execution requirements for executing the agent code can also be determined at this time and stored as part of the agent (e.g., as part of the execution contract data 626 of the agent transport payload 600). At 712, the agent is tasked. For example, the agent can be selected by an initiator 722 to perform the task for which its agent code is written. The agent code may be stored locally at the initiator or in a remote server (such as a central server on the network). The configuration parameters for the agent and the path for the agent (e.g., the identity of the nodes on the network that the agent is to be sent to) can be determined and set as part of tasking the agent at 712. This information is typically stored as immutable data (e.g., immutable data 620 stored in an "immutable data container") and signed by the initiator. At 714, the agent is sent to its destination. For example, the agent (e.g., comprising the agent transport payload 600) is transmitted on a network through a network services interface to a destination node (which may be the first of several destination nodes for the agent).

D. Exemplary Operations for Creating, Instantiating, and Upgrading Agents

This section introduce more detailed embodiments of performing agent-related actions, including agent creation, agent initiation, agent execution, agent upgrade, and agent validation.

1. Agent Creation

Figure 8:
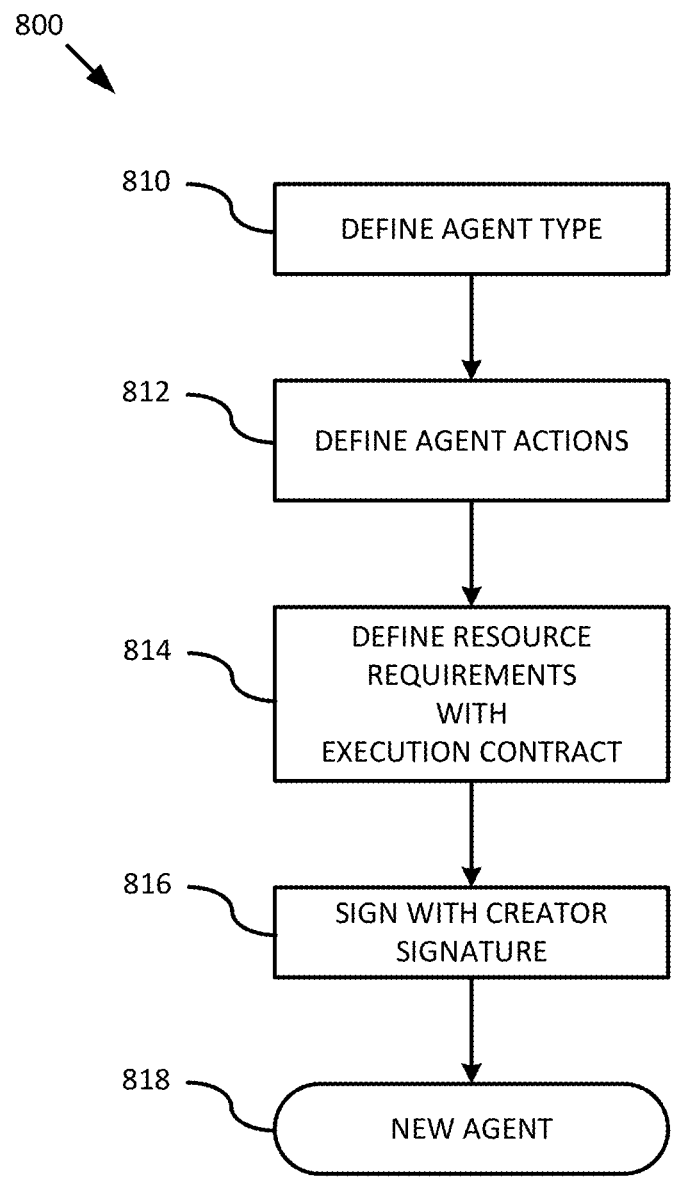
FIG. 8 is a flow chart of an exemplary method for creating an agent according to an embodiment of the disclosed technology.

FIG. 8 is a flow chart showing an exemplary technique 800 for creating an agent. Typically, the technique 800 is performed by a vendor or utility.

At 810, an agent type is defined. An agent can belong to one of multiple agent types. Agent types can be categorized based on the type of task performed, the network in which the agent operates, or other such bases. The agent type can be included as part of the data in the agent transport payload (e.g., as part of the agent code data 618 or the execution contract data 626).

At 812, the agent actions are defined. For example, the desired agent actions can be written as code that is executable in an agent execution environment and that causes the processor implementing the platform to perform the desired task. For example, the agent may be used to obtain data from sensors at the node, control one or more operations at the node (e.g., based on the sensed data), or to perform other such tasks. Exemplary tasks and actions that can be performed by agents are described in more detail below in Section V. The agent type can be included as part of the data in the agent transport payload (e.g., as part of the agent code data 618).

At 814, resource requirements for performing the agent action are defined. The resource requirements can be determined by simulations of the agent actions, emulations of the agent actions, an analysis of the operations used to perform the desired agent actions and associated memory requirements, or any other suitable mechanism. In particular embodiments, the resource requirements are defined as part of the execution contract data (e.g., execution contract data 626) of the agent transport payload.

At 816, a cryptographic hash of the portion of the payload created by the creator is signed with the creator's private key. The creator's asymmetric key pair can be X.509 or PGP, for example, and can be managed using the Cryptographic Trust Management system available from Pacific Northwest National Laboratories. Example encryption technologies include RSA, ECC, AES, and/or PGP.

At 818, the new agent (along with its creator signature) is stored (e.g., on one or more computer-readable storage media). The new agent can be transmitted to administrators in the network and stored locally or can be stored at locations that are accessed remotely by administrators in the network.

In particular implementations, the agent creation procedure 800 makes calls into one or more of an agent type list, an agent action list, a resource list, and/or an agent signing API.

2. Agent Initiation

Figure 9A:
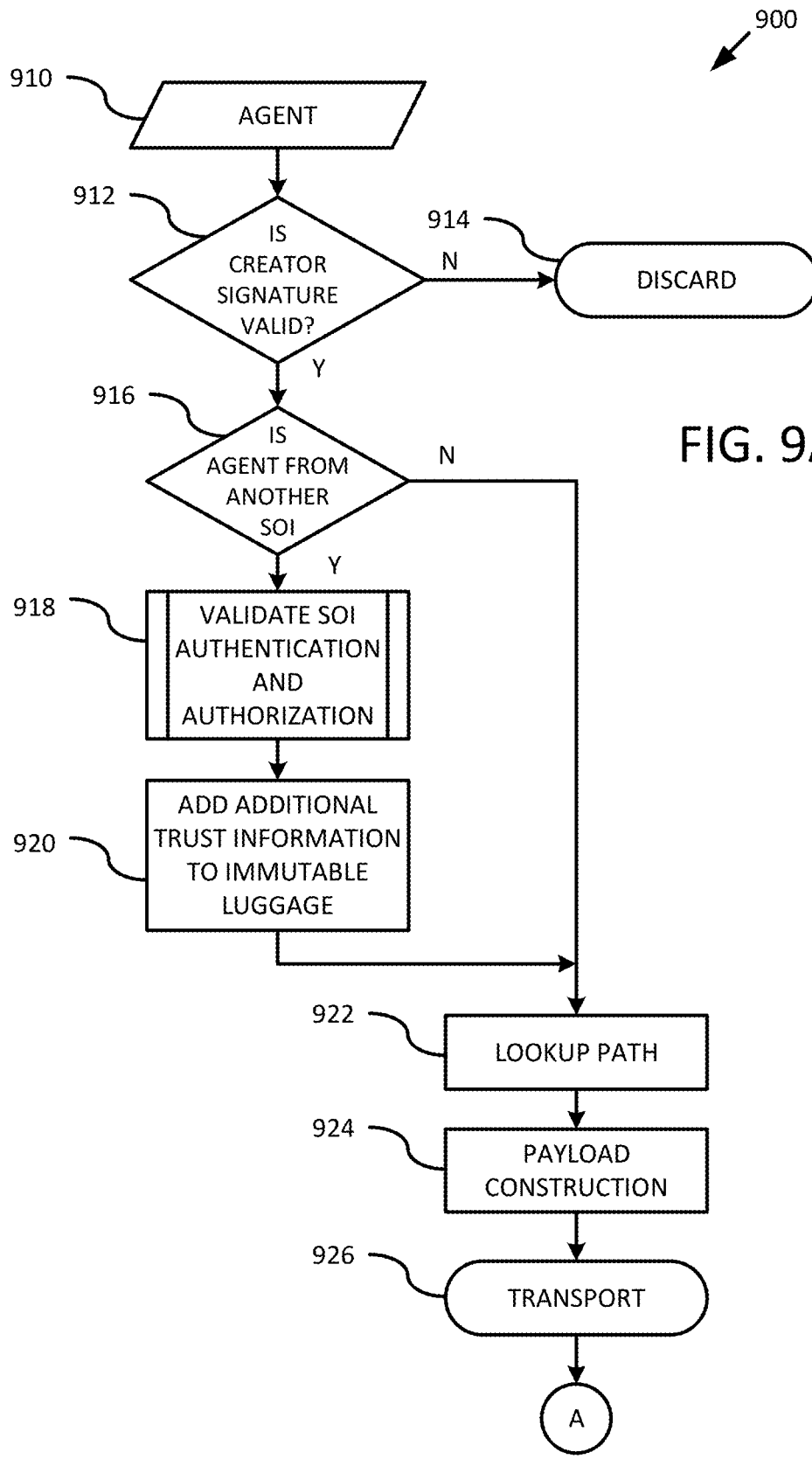
FIGS. 9A and 9B are flow charts for an exemplary method of initiating an agent and receiving an agent according to an embodiment of the disclosed technology.

FIG. 9A is a flow chart showing an exemplary technique 900 for initiating (or instantiating) an agent. Typically, the technique 900 is performed by an SOI administrator.

At 910, an agent is received. For instance, an uninitiated agent for performing a particular task can be loaded by an initiator (e.g., buffered into memory, loaded, or otherwise accessed for further processing). Or, an agent from another SOI can be received at a network services interface and loaded at a node in a local SOI.

At 912, a determination is made as to whether the creator signature is valid. For example, the creator's signed hash can be verified by the initiator using the creator's public key and the resulting hash can be compared to a hash of the creator-specific code generated by the initiator. In particular implementations, the signature is verified using the Cryptographic Trust Management system available from Pacific Northwest National Laboratories, X.509 certificates, or any other suitable signature encryption/decryption technique. If the creator signature is not valid, then the agent is discarded at 914; otherwise, the technique continues to 916.

At 916, a determination is made as to whether the agent is from another SOI. This determination can be made, for example, by checking the initiator data in the agent transport payload of the agent. If the agent is from another SOI, then the SOI is authenticated and authorized at 918. In particular embodiments, the SOI is authenticated and authorized by performing the method 1200 shown in FIG. 12 or by matching the initiating SOI to a list of authorized SOIs (e.g., stored in the trust store 512). If the agent is authorized, then additional trust information is added to the immutable data at 920. For example, information that approves the agent for use in the local SOI is added. If the agent is not from another SOI, then the technique 900 proceeds at 922.

At 922, the path for the agent is determined. For example, if the agent is being used to obtain information from a particular node or to control operation at a particular node, the path (e.g., the identity or network address for the node) can be determined. Or, if the agent is to be sent to multiple nodes, a list of the multiple nodes (e.g., the identities or network addresses for the multiple nodes) can be determined. This information can be determined, for instance, by accessing a directory service module (e.g., the directory service module 520, which comprises network identification information for the nodes in the network).

At 924, the agent transport payload is constructed and stored. For example, one or more of the initiator data 614, the immutable data 620 (including the agent path and the executable code for performing the desired task for the agent), the validation payload data 624, or the execution contract data 626 are set. Further, the destination data 610, the source data 612, and/or the mutable data 622 can be set. Any one or more of these data components or combinations thereof can be signed by the initiator.

At 926, with the agent transport payload constructed, the agent is transmitted to the one or more destination nodes on its agent path (e.g., via the network services interface 532).

Figure 9B:
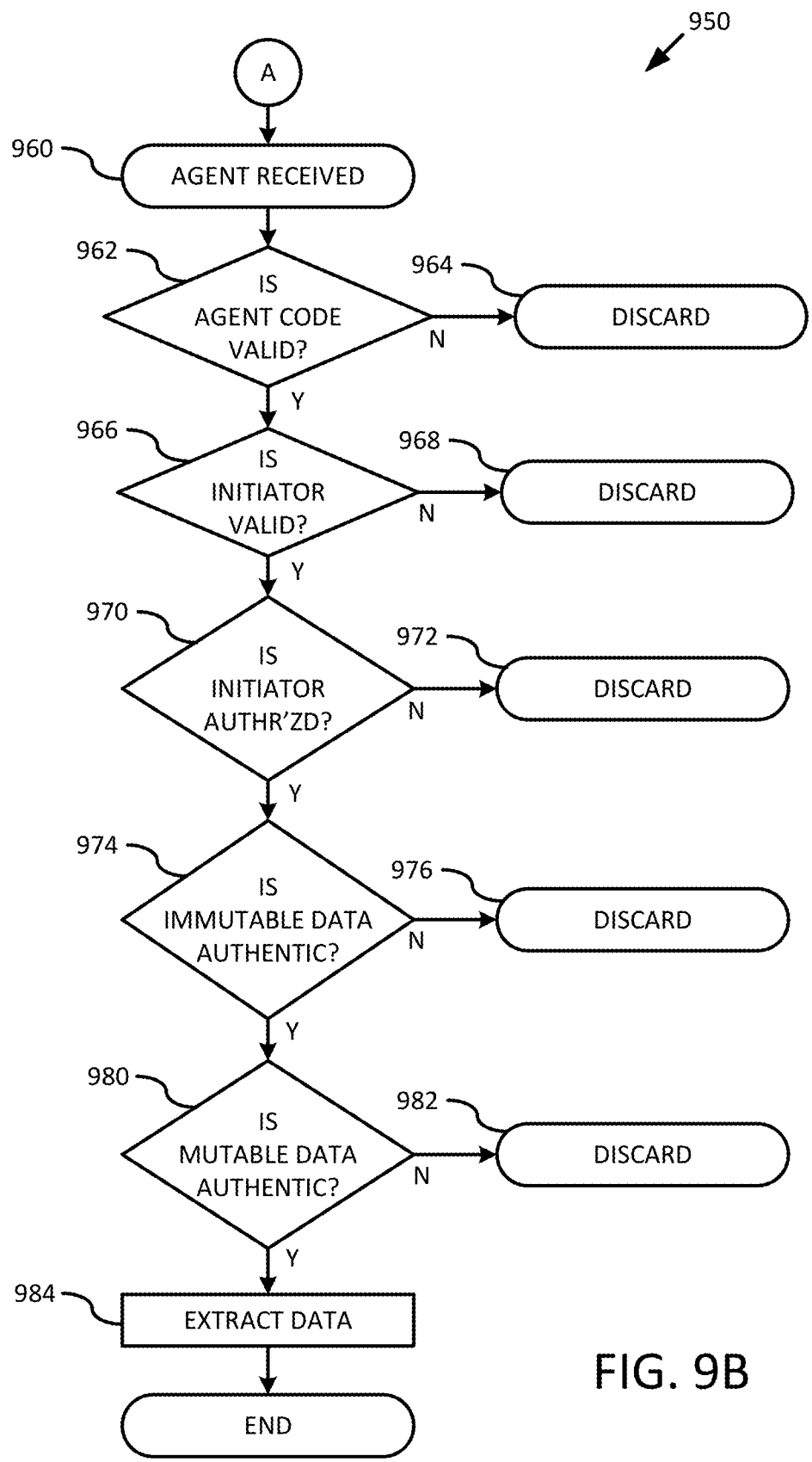

FIG. 9B is a flow chart showing an exemplary technique 950 for receiving an agent (e.g., a returning agent after being transmitted using technique 900, or any other agent)

At 960, the agent is received (e.g., buffered, loaded into memory, or otherwise accessed for further processing). For example, the agent can be loaded via the network services interface 532.

At 962, a determination is made as to whether the agent code has been tampered with. For example, a cryptographic signature sent with the agent transport payload can be checked and verified (e.g., using any of the encryption/decryption techniques mentioned above and using data stored in the trust store 512). In particular embodiments, a hash of the agent code can be computed and compared to a signed hash for the agent code sent with the agent transport payload. The hash for the agent code can be signed by one or more of the previous host (e.g., the sender), the initiator, or the creator, and can be decrypted using the public keys for these entities. The signed hash for any one or more (or all) of the sender, the initiator, or the creator can be used to verify the integrity of the agent code. For example, only a hash signed by the creator can be used to verify the agent code. If the agent code is not valid, the agent is discarded at 964; if the agent code is valid, the technique 900 continues at 966.

At 966, a determination is made as to whether the identity of the initiator is valid. For instance, the trust store 512 can be checked to determine whether the identity of the agent's initiator matches an initiator in the trust store. If the initiator identity is not valid, the agent is discarded at 968; if the initiator identity is valid, the technique 900 continues at 970.

At 970, a determination is made as to whether the initiator is authorized to dispatch an agent to the host and whether the SOI of the initiator matches the SOI of the device. For instance, the trust store 512 can be checked to determine whether the agent's initiator is an authorized initiator. If the initiator is not authorized, the agent is discarded at 972; if the initiator is authorized, the technique 900 continues at 974.

At 974, a determination is made as to whether the immutable data is authentic. For instance, a hash of the immutable data can be computed and compared to a signed hash for the immutable data sent with the agent transport payload. The hash for the immutable data can be signed by one or more of the previous host (e.g., the sender), the initiator, or the creator, and can be decrypted using the public keys for these entities. The signed hash for any one or more (or all) of the sender, the initiator, or the creator can be used to authenticate the immutable data. For example, only a hash signed by the initiator can be used to verify the immutable data. If the immutable data is not authentic, the agent is discarded at 976; if the immutable data is authentic, the technique 900 continues at 980.

At 980, a determination is made as to whether the mutable data is authentic. For example, a hash of the mutable data can be computed and compared to a hash sent with the agent transport payload. For example, the hash for the mutable data can be signed by the previous host (e.g., the sender) and can be decrypted using the public key for the sender. If the mutable data is not authentic, the agent is discarded at 982; if the mutable data is authentic, the technique 900 continues at 984.

At 984, data is extracted from the agent. For example, data is parsed and extracted from the agent transport payload.

In particular implementations, the agent creation procedure 900 can be called by calls through the network (e.g., network services interface 532) and can makes calls into one or more of the agent packaging and instantiation module 522, the authentication and authorization module 510, the directory service module 520, and/or the local store 526.

3. Agent Execution

Figure 10A:
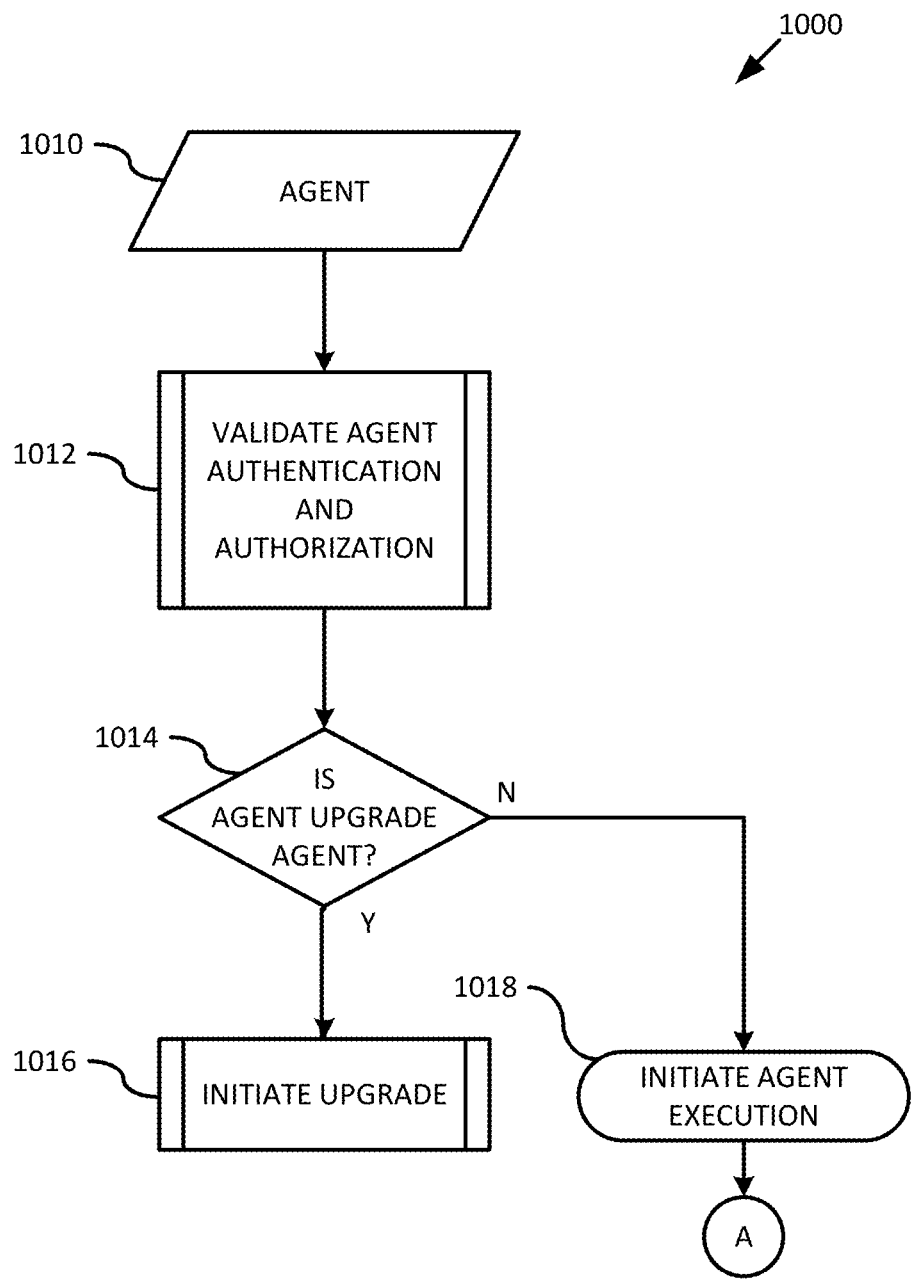
FIGS. 10A and 10B are flow charts for an exemplary method of executing an agent at a node according to an embodiment of the disclosed technology.

FIG. 10A is a flow chart showing an exemplary process 1000 for executing an agent. Typically, the process 1000 is performed by a host on the network (e.g., an intelligent sensor or intelligent controller (or other node on the network) that includes computing hardware for implementing the agent-based software platform (e.g., the software platform 500)). In general, the agent execution process 1000 includes a set of tasks which first verifies the authorization and authenticity of the agent prior to actual execution. Once execution has been competed, data is collected, a new path is selected, the agent payload is reconstructed, and the agent moves to another device.

At 1010, an agent is received at the current host. For instance, the host can receive the agent transport payload for the agent over a network (e.g., via network services interface 532) and identify the host as its destination (e.g., from the destination data 610). The agent transport payload can then be loaded by the host (e.g., buffered into memory, loaded, or otherwise accessed for further processing).

At 1012, the agent is validated using an authentication and authorization process (e.g., the authentication and authorization process 1200 shown in FIG. 12 and discussed below).

At 1014, a determination is made as to whether the agent is an agent upgrade. If so, then an agent upgrade process is performed at 1016 (e.g., the agent upgrade process shown in FIG. 11); otherwise, the process proceeds to 1018.

At 1018, the agent code is executed, resulting in the agent performing its intended task. For example, in particular embodiments, the agent code data 618 can be parsed from the agent transport payload and executed in the appropriate agent execution environment (e.g., agent execution environment 540).

Figure 10B:
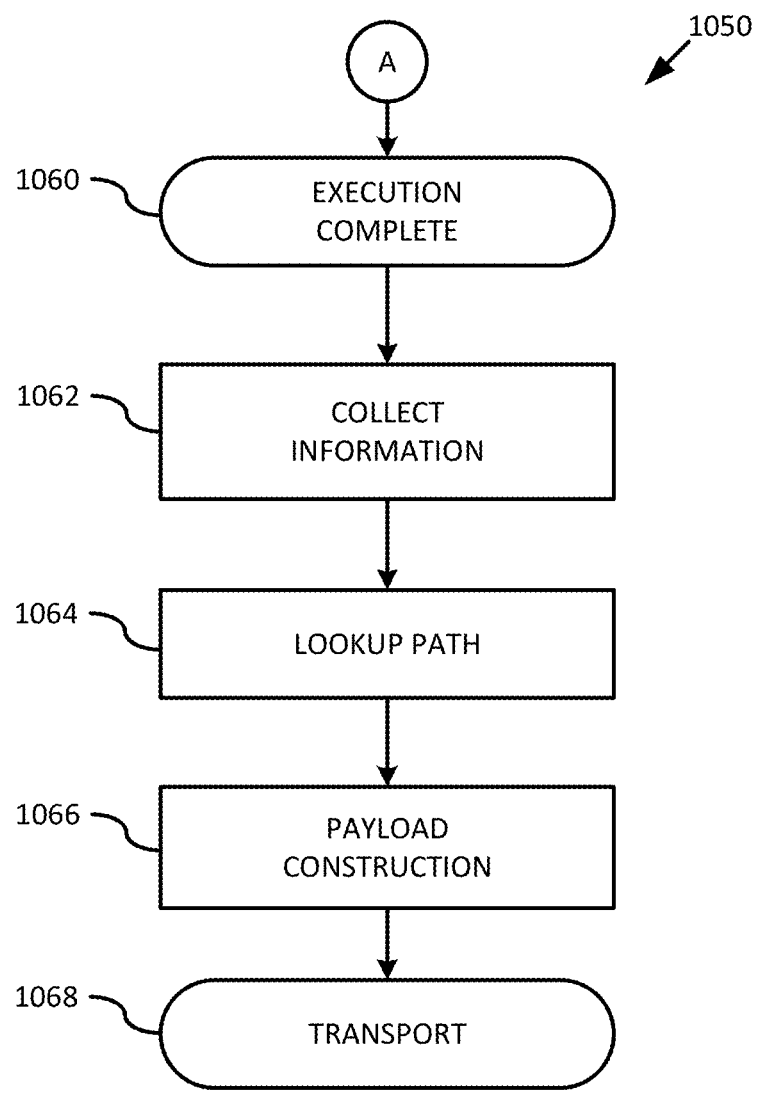

FIG. 10B is a flow chart showing an exemplary technique 1050 for processing an agent that has completed its task. Typically, the technique 1050 is performed by the same host on the network that received the agent and initiated its execution.

At 1060, an indication that the agent has completed its task is received (e.g., a flag, variable, or other parameter is set).

At 1062, information related to the performance of the task is collected. For instance, the data requested by the agent may be stored in a certain file or memory location, which is accessed so that the data can be loaded and stored as part of the mutable data 622 in the agent transport payload.

At 1064, the path for the agent is determined. This information can be determined, for instance, by accessing the immutable data (which lists the destination node(s) for the agent) and/or accessing a directory service module (e.g., the directory service module 520, which comprises network identification information for the nodes in the network).

At 1066, the agent transport payload is constructed and stored. For example, the mutable data (e.g., the mutable data 622) can be updated to include the information collected at 1062. Further, the current host can sign the mutable data with a cryptographic signature At 1068, with the updated agent transport payload constructed, the agent is transmitted (e.g., via the network services interface 532) to the next destination node on its agent path (or back to the initiator if there are no further destination nodes).

In particular embodiments, the agent execution process is called by the network module (e.g., network services interface 532) when an agent arrives at the host (or node) of the network. The agent execution process can call into one or more of a validation and authentication process (e.g., authentication and authorization process 1200 shown in FIG. 12), agent upgrade process (e.g., agent upgrade process 1100 shown in FIG. 11), agent execution process (e.g., an execute agent process performed by the agent execution environment 540), network process (e.g., a process for moving the agent to a next device performed by the network module 532), information exchange bus (e.g., a process for collecting data performed by the information exchange bus 524), directory services process (e.g., a process for selecting a new device performed by the directory service module 520), and/or payload construction process (e.g., a process for payload construction performed by agent packaging and instantiation module 522).

4. Agent Upgrade

Figure 11:
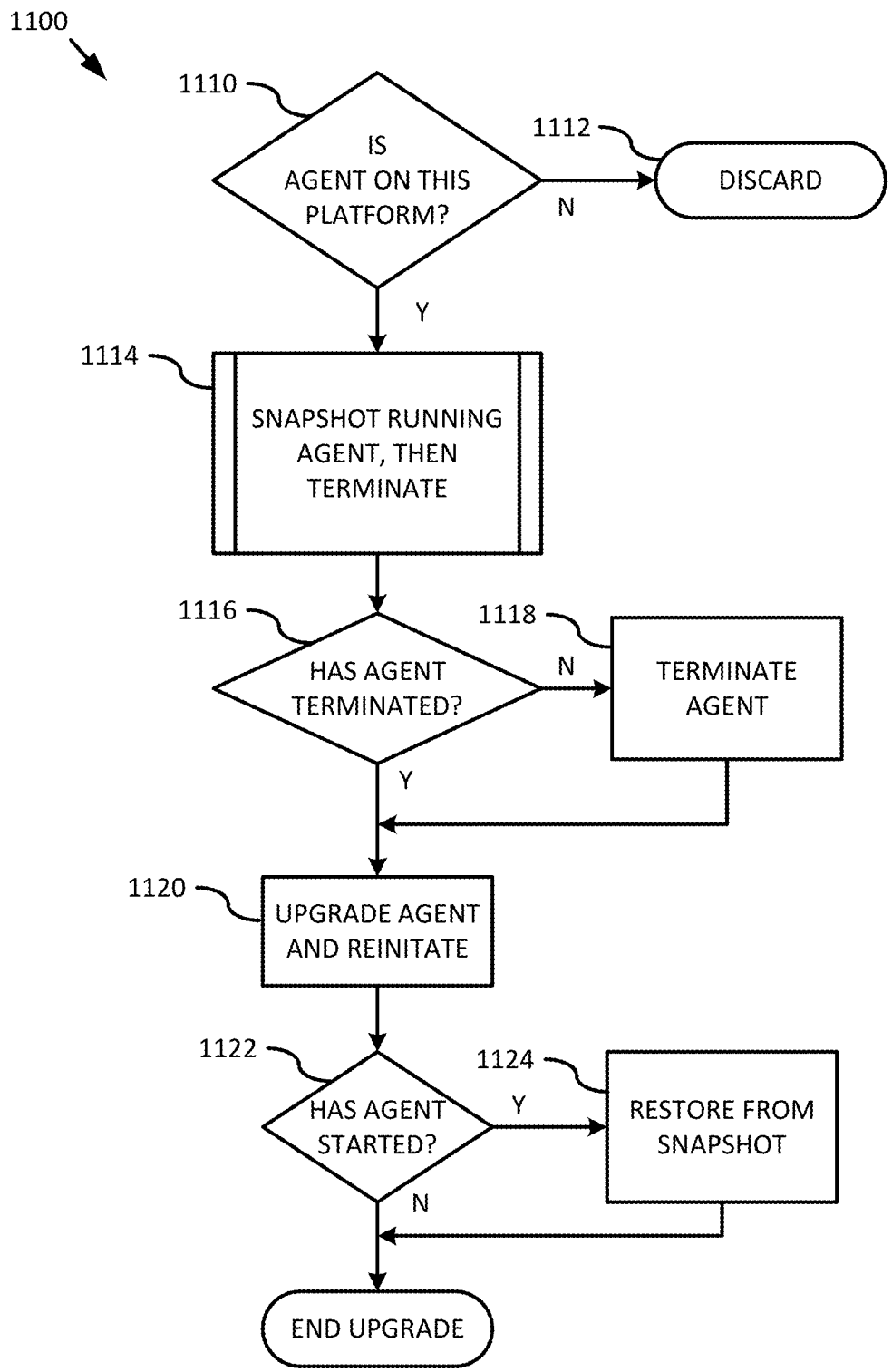
FIG. 11 is a flow chart for an exemplary method for upgrading an agent according to an embodiment of the disclosed technology.

FIG. 11 is a flow chart showing an exemplary process 1100 for upgrading an agent. Typically, the process 1100 is performed by a host on the network (e.g., an intelligent sensor or intelligent controller (or other node on the network) that includes computing hardware for implementing the agent-based software platform (e.g., the software platform 500)). In particular implementations, this is a common module for all platforms and checks for an upgrade agent. If the agent is authentic and authorized, this process then upgrades the agent.

At 1110, a determination is made as to whether the agent upgrade is for an agent on the current host. If the upgrade agent is not for an agent on the current host, then the agent upgrade is discarded at 1112; if the upgrade agent is for an agent on the current host, then the process proceeds at 1114.

At 1114, a snapshot of the state of the agent is made (e.g., by storing information indicative of the current state of the agent, which may be currently executing). The agent can then terminate.

At 1116, a determination is made as to whether the agent has terminated. An agent that does not support upgrade-in-place functionality, for example, may not terminate. If the agent has not terminated, then the agent is forcibly terminated at 1118 (e.g., by the operating system or the platform forcibly stopping further execution of the agent code). If the agent has terminated, then the method continues at 1120.

At 1120, the agent upgrade is performed and the agent is reinitiated. The agent upgrade can be performed by replacing one or more components (or the entirety) of the agent code and/or adding new agent code. Re-initiation can occur by the upgraded agent being executed in its appropriate agent execution environment.

At 1122, a determination is made as to whether the upgraded agent has started executing again. If so, then, at 1124, the state of the agent is restored from the stored snapshot; otherwise, the agent will be restarted from a clean data store when it starts again.

In particular implementations, the agent upgrade process is called by the agent packaging and instantiation module 522. The agent upgrade process can call into one or more of an agent snapshot process, a resource manager process (e.g., an "agent run check" process and/or "agent termination" process performed by the resource manager), agent execution process (e.g., a "start new agent" process or "restore agent from snapshot" process performed by the agent execution environment 540)

5. Agent Validation

Figure 12:
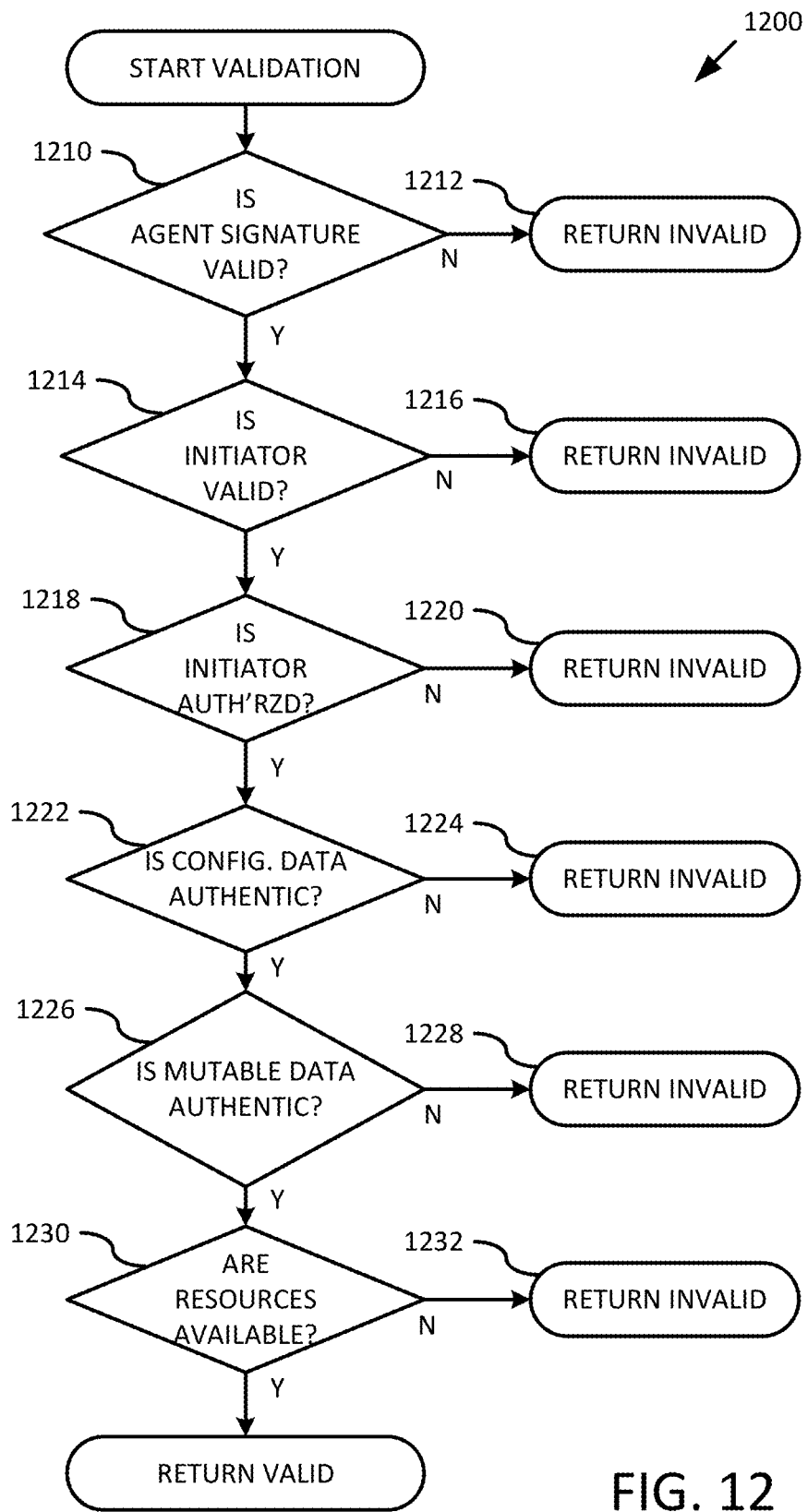
FIG. 12 is a flow chart for an exemplary method of authenticating and authorizing an agent according to an embodiment of the disclosed technology.

FIG. 12 is a flow chart showing an exemplary technique 1200 for performing an authentication and authorization process. Typically, the technique 1200 is performed by a host on the network (e.g., an intelligent sensor or intelligent controller (or other node on the network) that includes computing hardware for implementing the agent-based software platform (e.g., the software platform 500)) when an agent is received. In particular embodiments, the technique 1200 is performed by the authentication and authorization module 510 in the software platform 500. In particular implementation, the authentication and authorization process 1200 is part of a common module for validation of authentication, authorization, and identity.

At 1210, a determination is made as to whether the agent signature is valid. For example, a cryptographic signature sent with the agent transport payload can be checked and verified (e.g., using public key data stored in the trust store 512). The agent signature can be the signature from one or more of the creator, the initiator, and/or the previous host (e.g., the sender). If the agent signature is not valid, the agent is discarded at 1212; if the agent signature is valid, the technique 1200 continues at 1214.

At 1214, a determination is made as to whether the identity of the initiator is valid. For instance, the trust store 512 can be checked to determine whether the identity of the agent's initiator matches an initiator in the trust store. If the initiator identity is not valid, the agent is discarded at 1216; if the initiator identity is valid, the technique 1200 continues at 1218.

At 1218, a determination is made as to whether the initiator is authorized to dispatch an agent to the host and whether the SOI of the initiator matches the SOI of the device. For instance, the trust store 512 can be checked to determine whether the agent's initiator is an authorized initiator. If the initiator is not authorized, the agent is discarded at 1220; if the initiator is authorized, the technique 1200 continues at 1222.

At 1222, a determination is made as to whether the configuration data included with the immutable data is authentic. For instance, a hash of the configuration data can be created and compared to a decrypted hash for the configuration data sent with the agent transport payload. The hash for the configuration data can be signed by one or more of the previous host (e.g., the sender), the initiator, or the creator, and can be decrypted using the public keys for these entities. The signed hash for any one or more (or all) of the sender, the initiator, or the creator can be used to authenticate the configuration data. If the configuration data is not authentic, the agent is discarded at 1224; if the immutable data is authentic, the technique 1200 continues at 1226.

At 1226, a determination is made as to whether the mutable data is authentic. For example, a hash of the mutable data can be created and compared to a hash sent with the agent transport payload. For example, the hash for the mutable data can be signed by the previous host (e.g., the sender) and can be decrypted using the public key for the sender. If the mutable data is not authentic, the agent is discarded at 1228; if the mutable data is authentic, the technique 1200 continues at 1230.

At 1230, a determination is made as to whether resources are available to perform the agent's task. For example, the resource requirements stored as part of the execution contract data 626 in the agent transport payload can be extracted and compared to available resources using information from the resource monitor 530. If sufficient resources do not exist, the agent is discarded at 1232; if sufficient resources exist, then the technique 1200 generates an indication that the agent is authorized and authenticated (e.g., by setting a flag, variable, or other parameter)

In particular implementations, the process 1200 is called by an agent initiation process (e.g., agent initiation process 900 shown in FIG. 9) and/or by an agent execution process (e.g., agent execution process 1000 shown in FIG. 10). The authentication and authorization process 1200 can call into one or more of the following: a signature validation process, an authorization validation process, a data authorization validation process, a data authentication process, and/or a resource manager process (e.g., an "are resources available" process performed by the resource monitor module 530).

V. Exemplary Applications for Embodiments of the Disclosed Intelligent Sensors and Controllers In this section, exemplary applications for the disclosed agent-based, intelligent sensors and intelligent controllers are described. The applications disclosed in this section are not to be construed as an exhaustive list, but are illustrative of the operation and capabilities of the disclosed technology.

A. Distributed Generation as a Forecastable Resource

Currently, there is uncertainty about the integration of distributed resources such as rooftop solar panels, end-customer wind turbines, end-customer battery storage, and plug-in hybrid electric vehicles ("PHEVs"). For example, an electricity generator plugged into the electric power system at the distribution layer is treated as "negative" load. This means that it is not actively accounted for and is not integrated into the electricity operations planning like a bulk power generator. Specifically, even when ample capacity is available from distributed resources in the distribution system, the current system is unable to accommodate this capacity by flowing power from the distribution system back to the transmission system and to a different location where the power may be needed.

One exemplary application of the disclosed technology is to forecast and aggregate distributed resources that are connected (electrically) to the distribution system. In one implementation, this application can be performed using an embodiment of the disclosed software framework and can have the following components: (1) a forecaster/historian agent located at the distribution substation; (2) resource availability agents that gather a list of distributed resources and monitor their status in real time; and (3) resource integration agents that are responsible for collecting resource generation information. The collected information can then be made available to the forecaster located at the distribution substation.

For instance, the distributed resource forecaster can collect information generated by the agents and use this information for generating forecasts for the resources at a variety of future times (e.g., 60 minutes ahead, 360 minutes ahead, 24 hours ahead, or any other forward-looking time interval). A variety of forecasting techniques can be used to generate the forecast as are known in the art. These forecasts can be made available to the utility system operations center and can be treated similar to a forecast coming from a bulk power generator.

B. Sequencing Load in the Distribution System

Consumer loads are largely resources that are not under the control of the utility. A demand/response architecture uses two-way communication between the utilities and consumers and allows the utility to shed certain loads during peak loads. One side effect of this type of technology, however, is that the loads get synchronized and the resulting power draw on the feeders has large peaks and valleys. This causes almost the opposite effect of the desired resource management goals.

To control consumer loads more effectively, one application of the disclosed technology is to use the agent-based framework to sequence certain types of consumer base loads, providing a more stable equivalent load to the sub-transmission system. For instance, consider a neighborhood in which each of the water heaters has an intelligent controller allowing for intra-feeder communication. Through an automatic negotiation process between two or more controllers, the intelligent controllers can determine that they have peak usage in the morning and rather than all turning on at the same time, they can generate a time-slicing sequence that allows the water heaters to heat water one (or two, or more) at a time. Additionally, the intelligent controllers can be aware of typical usage times and pre-heat in a similar fashion. In particular implementations, if the temperature drops below some threshold, a device can drop out of the time-slicing mode and activate the water heater. Overall, however, the general use would be coordinated. Such time-slicing can not only be applied to water heater operation, but also to other controlled appliances (e.g., HVAC systems, dishwashers, washer and dryers, battery chargers, and the like). Further, a substation can receive knowledge of the time-slicing behavior on a feeder and use it for its own planning needs. In one example implementation, an agent-based framework can provide one or more of the following capabilities for performing load sequencing: (1) consumer-level distributed agent technology that can describe a load's characteristics (e.g., time of day, duration, frequency, seasonal adjustment, and the like); (2) sequencing and voting to develop a time-slicing scheme (e.g., based on load characteristics); and (3) automatic grouping of intelligent sensors and/or controllers into "smart" groups (e.g., based on the number of sensors and controllers in group, the sensors and controllers being on the same feeder, and the like).

An exemplary embodiment of a load sequencing method is described below with respect to FIGS. 13A and 13B.

C. Goal-Based Demand Response

There are two types of demand-response schemes currently employed in the electric power system. The traditional demand-response schemes are based on direct load control where a utility triggers a responsive asset to turn on and off by means of a communication channel. A second type of demand response uses a price signal to elicit customer behavior that results in a reduction of load through voluntary means. Note that while direct load control is deterministic, price-signal-based demand response is non-deterministic.

In one exemplary implementation, the disclosed distributed agent technology is used for a collaborative demand response scheme with interacting agents that work together to achieve a demand management goal and confirm the amount of load reduction to the rest of the utility network, thereby alleviating the non-deterministic nature of price based demand response. For example, a zone controller can be identified as an entity that sets demand reduction goals for the zones that are under its control/influence. The zone controller can assign a load reduction goal to its subsidiaries, and this zone reduction goal can flow through the system from a first tier (which could be interpreted as a region controlled by a balancing authority) to one or more second-tier zones (e.g., utilities) and down to lower tiers (e.g., individual distribution substations). The agent framework can be extended to equipment located at customer premises as well. At each tier, the zone controllers can be implemented as "software agents". The software agents can collaborate with each other, exchange information (securely), and iterate until desired goals are reached.

In particular implementations, the amount of demand response achieved is collected and communicated up the zonal hierarchy to the first-tier zone controller. Therefore, the zone controller does not need to rely on metering observations to see whether the demand response scheme is working. Further, agents for each household can have different settings for different priorities (maintain power level vs. take advantage of price). Aggregate results of the interaction of those agents can be the response for the "neighborhood".

In some implementations, the agents at the residences collaborate with each other to prevent oscillatory load behaviors by coordinating when loads come online and go offline. The agents may also use a price signal for the communication of a demand response goal between tiers in the zonal hierarchy.

In particular implementations, the collaborative demand response system is implementable at various layers of the electric power system, capable of communicating upward or downwards in the hierarchy, capable of moving and deploying agents based on other goals throughout the system (e.g., triggering of PHEVs to charge, or battery storage elements to charge), capable of crossing (or at least communicating across) organizational boundaries, and/or capable of accomplishing a goal/task in a short period of time (e.g., less than 300 seconds).

In particular implementations, the zone controller agent is configured to communicate with agents in the levels above and below and/or to receive state information for agents below it in the hierarchy in order to form its state which it then reports to the hierarchy above. Further, the zone controller agent can be configured to receive a demand response goal from an agent higher in the hierarchy (which could be a human operator). The agent can then access its resources and task other agents to determine what its potential response can be. Further, the zone controller agent can be configured to receive a task from the above hierarchy and to distribute this to agents below. Further, the zone controller can be configured to request agents below for an estimate on demand reduction (which may ask agents below them), to aggregate the estimates, and to return the aggregated estimate.

D. Automatic Topology Discovery

Topology refers to the interconnection of resources in an electrical network. Traditionally, engineers explicitly define each of the interconnect possibilities. For instance, a SCADA engineer typically has to explicitly define each "tag" (voltage, current, and so on) within a substation, along with what electrical device it corresponds to (transmission line 47, or breaker 134, etc.). This process of explicitly defining the tags is both time consuming and susceptible to being quickly out-of-date. The difficulty in maintaining definitions for all tags in the system becomes more challenging when one considers a future electrical system filled with distributed generators constantly being added to the system and causing a need for updates to the network settings.

In embodiments of the disclosed agent-based system, agents are used to facilitate the automatic discovery of data and topological interconnections. In particular implementations, an agent is programmed to have (or collect) knowledge of the electrical characteristics of the asset it is associated with, the location of the asset in the network, and/or the physical world identification of the asset. Further, the agent is programmed to advertise its available data upon request. Such embodiments can be used to reduce the barriers to wide area management as well as localized distribution level distributed generation.

E. Localized State Estimation

State estimation is a tool currently used by utilities in the control center to evaluate the stability of the electrical grid. In embodiments of the disclosed agent-based system, agents are used to collect state data. For example, the state eigenvalues (or other values) for a given substation can be measured directly in real-time by agents on the one or more feeders of the substation. These eigenvalues can then be transferred to the control center for a real-time state view of the power system.

F. Automatic Fault Location

Fault location typically refers to the ability to determine the physical location of the fault. Simple fault locators are attached to aerial power system lines and will trip a flag (or light up with blinking LEDs) during an unusually high current event, such as a short circuit. A lineman will use these indicators to manually locate a fault (typically on a distribution network).

In exemplary embodiments of the disclosed agent-based system, agents are used to perform fault location on a distribution network. In certain implementations, the agent sensors have knowledge of their location on the electric power topology. Inter-agent communication during fault events could then be used to locate the effected sensors during an event. This information can assist utilities in the mitigation of a distribution-level outage, as well as provide a foundation technology for automatic outage management. In such implementations, the agents are configured to collect or have knowledge of their location on the power system, to have network connectivity, and to have a process for sending information about its state and location to a utility.

G. Distribution-Level Wide-Area Protection Distribution refers to the low-level power system supply which feeds consumers, such as what is connected to the average house. Due to the numerous connections, the distribution network utilizes low cost electrical protection devices such as fuses and recloses. These devices have performed satisfactory in the past; however, they have shortcomings for needs of consumer-level distributed generation.

In exemplary embodiments of the disclosed agent-based system, an agent is used to provide information that identifies the status of the distribution network at various nodes on the network. Such information could be collected by a common aggregator with the ability to detect abnormal conditions. If such a condition is detected, a backchannel communication can inform an agent on a distributed generator's controller to stop or to switch from delivering power into the power system to delivering power to one or more homes directly connected to the generator, thus mitigating a power system hazard.

In particular implementations, load sensor are capable of publishing load parameters and allowing for remote control during safety events, generation sensors are capable of being coordinated, and a sequencer sensor is able to coordinate generation and load sensors as well as integrating with any existing SCADA infrastructure.

VI. Example Implementation of an Agent for Performing Load Sharing

This section describes exemplary methods for performing load sharing according to embodiments of the disclosed technology. The exemplary methods are described using the example of a substation that provides power to several homes. The substation receives energy goals from upstream (e.g., from a regional distributor) which the substation must meet to ensure smoother energy use throughout the grid. When the substation detects that energy use will be above the goal, it can send conserve signals to its houses asking them to reduce consumption. In this example, a house receives its energy from the substation. A house can have several appliances (e.g., an HVAC, refrigerator, and the like) as well as a base load which takes into account all other uses (e.g., lighting, television, and the like). In the discussion below, only water heaters are considered as controllable devices, but the agent-based scheme can be adapted to include other controllable devices as well (e.g., an HVAC system, electric vehicle chargers, and the like). In this example, the water heater draws power from its house. The water heater can be in one of two states: waiting or heating. While waiting, the water heater monitors the energy of the water (e.g., the temperature of the water, or a value based on the temperature and volume of the water in the heater) to determine if the energy is at its goal. If the water energy drops below a tank energy goal, then the heater enters the "heating" state, where it heats the water until it reaches the goal. Once the energy of the tank is at the goal, it goes back to the "waiting" state. The water heaters in this example also have a "low water mark" signal, which indicates that the tank energy is critically low. In this example, if a water heater is under its low water mark, its house will ignore a conserve request. Further, in this example, the inhabitants of the house are assumed to "consume" the resources of the house. For instance, each resident has a schedule for when they will take a shower which has the effect of reducing the energy in the water heaters tank.

The example discussion in this section uses a "token"-based system. The token can be a software representation of a token and can be transmitted to agents associated with other homes. A house possessing a token (e.g., a house being assigned to the representation of the token) can draw its requested load from the substation. A house not possessing a token cannot draw its requested load from the substation. Furthermore, in the example below, a token allows a house to draw its required load for a set number of time cycles (e.g., 2-100 time cycles). The value of a token can begin at the total number of time cycles available with the token (e.g., 10). As a token is used for a given time cycle, the value of the token is decremented (e.g., decremented by one). When the token's value is 0, the token expires. Each token can have the same starting value, or can be individually tailored for a particular energy usage (e.g., the token can represent the number of time cycles necessary for raising the energy level of a water heater from its current state to its desired energy level).

In one exemplary embodiment, an agent associated with the water heater is responsible for determining whether to operate the water heater or not. In one implementation, the decision-making process is performed at fixed time intervals (e.g., every 10 minutes, 5 minutes, 1 minute, 30 seconds, 10 seconds, 1 second, or any other period of time). For every time interval (also referred to as "ticks" or "time cycles"), there is a sequence of agent actions that happen. Water heaters in a waiting state enter a heating state if their tank energy is below goal. Water heaters in a heating state enter a waiting state if the tank is at its respective goal. Next, houses estimate their energy usage based on the state of their water heaters and their base energy usage. The substation receives these estimates and compares them against their load goal. If the total is over the load goal, the substation enters a conserve state. The substation in the conserve state sends a "conserve" signal to its houses and enters a monitor state if their estimate is under goal or a conserve timeout has elapsed. In certain embodiments, a house receiving a conserve signal polls its appliances as to their ability to conserve. Water heaters willing to conserve are maintained or switched back to their wait state.

Several different exemplary techniques can be used by the agent at a house to control energy usage and attempt to keep the usage under the goal. Three exemplary techniques are described below: the global signal technique, the individual signal technique, and the cooperative technique. It should be understood that these techniques are introduced for illustrative purposes, and that additional or variations of these techniques are possible.

According to the global signal technique, if the substation detects that energy use is over goal, then for some fixed period (e.g., 20 minutes, 10 minutes, 5 minutes, or any other period of time), the substation will send a conserve signal (such as a "high energy price" signal) to the houses that it controls (e.g., all houses). At each time cycle, a house can decide whether or not to honor the request. For instance, if "low water mark" signals are being honored, then the house will always ignore a conserve request if its water heaters energy is too low.

According to the individual signal technique, at every time cycle that a substation detects energy use is over goal, it sends a conserve signal (such as a "high energy price" signal) individually to all houses that it serves. If a house chooses to respect the signal, then the house controls the water heater so it is shut off for some fixed period (e.g., 20 minutes, 10 minutes, or any other period of time). The conserve signal can be ignored if the "low water mark" is reached.

According to the cooperative technique, household agents cooperate with one another in order to meet the substation's energy goal. For example, using a set of rules common to all the agents (and defined, for example, in the agent code 618 of the agent transport payload), an agent individually decides whether or not to claim an energy use token (e.g., for a current time cycle or a next upcoming time cycle). While the agent maintains the token, that house is allowed to meet its energy needs.

According to one embodiment of the cooperative strategy, the houses follow the rules and respect assignment of the tokens. The global and individual techniques can also be run this way, but this leads to poor behavior. For instance, if all houses respect the conserve signal, then they will eventually synchronize, causing them all to turn on at once. If this causes the energy goal to be exceeded, then the substation will send out a conserve signal, causing all water heaters to turn off. The resulting pattern is one of spikes where all heaters turn on, then periods of inactivity while all heaters conserve. To overcome this problem, each house could have a random probability during each time cycle of respecting the conserve signal.

In particular embodiments, household agents operating using the cooperative technique use a "belief-desire-intent" model of agent behavior. According to this model, the "belief" of the agent is based on states of the other agents (e.g., energy use, priority), the "desire" of the agent is based on the goals of the agent (e.g., to meet its substation's energy use goal while still maintaining quality of service to its resident), and the "intent" of the agent is based on their available actions (e.g., run their appliances or to conserve).

In each time cycle, the household agents for the substation send their estimated energy use and their priority. In one implementation, the priority sent by an agent is (or corresponds to) the energy level of the water heater(s) in its associated home. This information forms each agent's beliefs about the current needs of their neighbors. Each agent then evaluates these beliefs against the desire to meet the energy goal of the substation while also keeping quality of service for their residents. To do this, each agent can operate using a common set of rules.

Figure 13A:
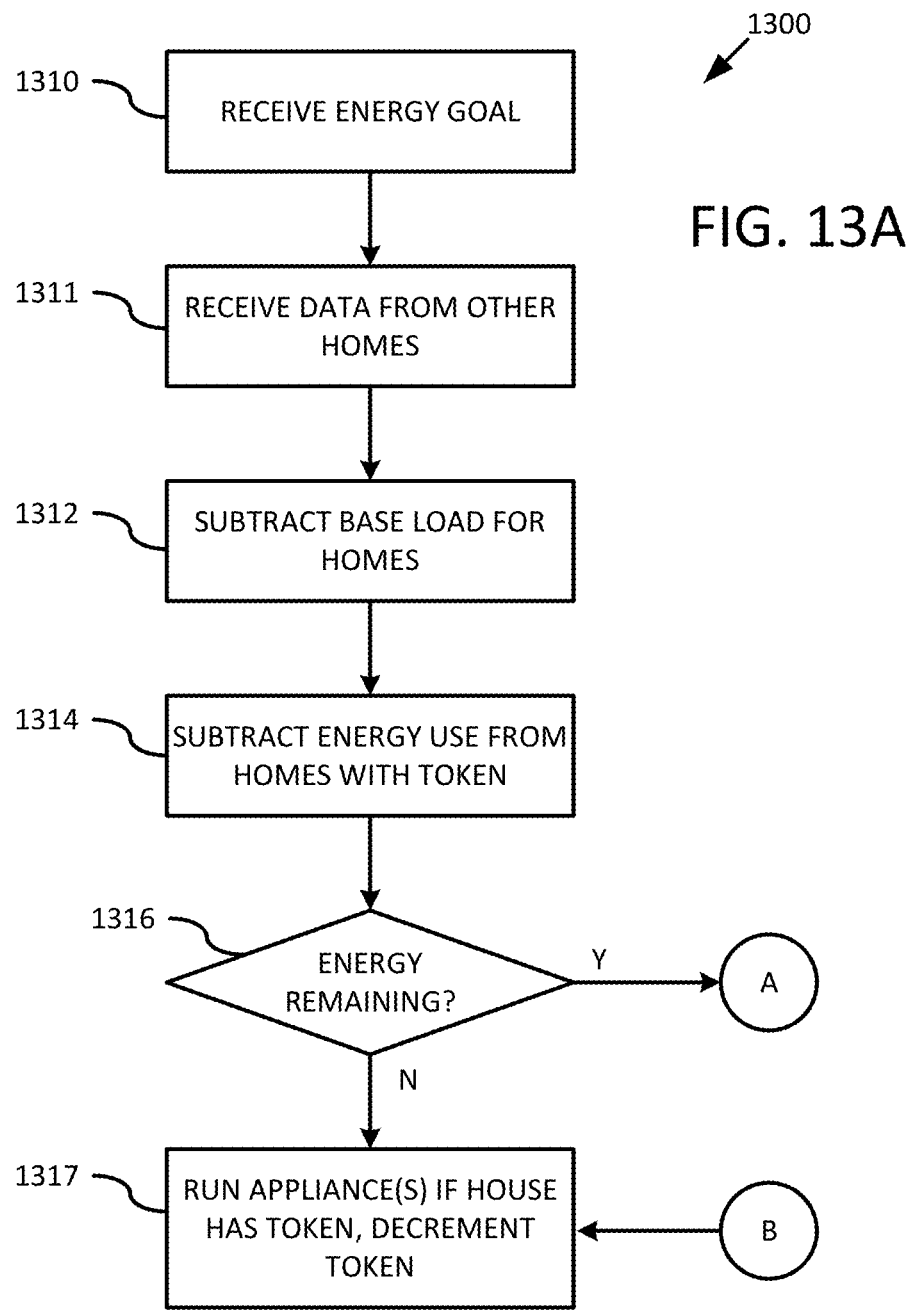

FIGS. 13A and 13B illustrate one exemplary process 1300 used by an agent to determine whether it should take an energy-use token.

At 1310, an energy goal is received. For instance, the energy goal can be sent from the substation and stored locally at the agent's host until changed.

At 1311, information from the other houses is received. The information received can include, for example, the identity of the house, the estimated energy use for the house, the priority of the house (e.g., the energy level of the water heater), the low water mark for the house, the tank energy goal for the house, and an indication of whether the house is using a token for the upcoming cycle (e.g., the next time cycle).

At 1312, the base load required from each house is subtracted from the energy goal.

At 1314, the energy for houses with a token for the upcoming time cycle is subtracted from the remainder of the energy determined at 1312.

At 1316, a determination is made as to whether any energy remains. For example, in particular implementations, a determination can be made whether the remaining energy is sufficient to perform any of the estimated energy usages from the remaining houses without tokens. If there is insufficient energy, then the procedure is complete, and the houses with tokens run their appliances in the next time cycle but decrement their token value at 1317; if energy remains, the process proceeds at 1318.

At 1318, a list of houses with no token is generated.

At 1320, a determination is made as to whether any houses in the list are below the low water mark. If one or more houses are below the low water mark, then the process proceeds at 1322; otherwise, the process proceeds at 1332.

At 1322, the house having a current energy level farthest from the low water mark is selected.

At 1324, a determination is made as to whether the selected house is the house controlled by the agent. If so, the agent claims a token at 1326 and subtracts its energy usage from the remaining energy at 1328; otherwise, the agent just subtracts the selected house's energy usage from the remaining energy at 1328.

At 1329, the selected house is removed from the list.

At 1330, a determination is made as to whether any energy remains. For example, in particular implementations, a determination can be made whether the remaining energy is sufficient to perform any of the estimated energy usages from the remaining houses without tokens. If there is insufficient energy, then the procedure is complete, and the houses with tokens run their appliances in the next time cycle but decrement their token value at 1317; if energy remains, the process repeats at 1320.

At 1332, a determination is made as to whether any houses in the list are below their tank energy goals. If one or more houses are below their respective tank energy goals, then the process proceeds at 1334; otherwise, the process proceeds at 1317, where houses with tokens run their appliances in the next time cycle but decrement their token value.

At 1334, the house having a tank energy goal closest to (or farthest from) its respective tank energy goal is selected.

At 1336, a determination is made as to whether the selected house is the house controlled by the agent. If so, the agent claims a token at 1338 and subtracts its energy usage from the remaining energy at 1340; otherwise, the agent just subtracts the selected house's energy usage from the remaining energy at 1340.

At 1342, the selected house is removed from the list.

At 1344, a determination is made as to whether any energy remains. For example, in particular implementations, a determination can be made whether the remaining energy is sufficient to perform any of the estimated energy usages from the remaining houses without tokens. If there is insufficient energy, then the procedure is complete, and the houses with tokens run their appliances in the next time cycle but decrement their token value at 1317; if energy remains, the process repeats at 1332.

Acting by the rules set forth in process 1300 means that priority is given to those houses with the worst quality of service. This prevents "sacrificing" a house so that others may reach their goals faster. It also means that once a minimum is met, priority goes to the houses closest to reaching their goal in order to take them out of the equation. This simplifies the latter stages of planning.

To test the exemplary method shown in FIG. 13, a simulation was performed. In the simulation, the water heater was modeled as a 40 Gallon tank with two 4.5 KW heating elements. The first law of Thermodynamics, conservation of energy, provides the basis for calculating the water heater's load characteristics. The change in enthalpy is the energy required to heat the water to the desired 50° C. output based on the following equation:

$$\Delta H = mc_p \Delta T \quad (1)$$

where $\Delta H$ is the change in enthalpy (J), m is the mass of the water (kg), $c_p$ is the specific heat of water at constant pressure (J/mol*K), $\Delta T$ is the change in temperature (° C.).

For the 160 L tank (roughly equivalent to 40 Gallons) with an incoming water temperature of 10° C. and outgoing temperature of 50° C., the change in energy is approximately 30.8 MJ. Using the tank's 4.5 KW heating element will thus take approximately 114 minutes to heat the tank from an initial state.

To model the usage requirements, the following parameters were used. The standard shower consumes 12 gallons of hot water, which in turn requires 9.6 MJ of energy to restore the tank to its heated condition, or 35.6 minutes to return a fully heated state. In other words, if the shower lasted 5 minutes, during that time the tank experienced a loss of energy at the rate of approximately 32 KW.

The simulation was performed considering a single substation. Runs were done with the substation having 5 houses for each of the three techniques introduced above. Energy goals of 30, 35, and 45 were used. Each house had a baseload of 5 kW/s and each water heater consumed 4.5 kW/s when heating water in the tank. Residents took showers randomly between 6 a.m. and 7 a.m. with a random duration from 5 to 15 minutes. However, the behavior of the residents was consistent for each strategy during a run. The worst case for every system is when there is only enough room in the energy goal to run one house's water heater.

Figure 14:
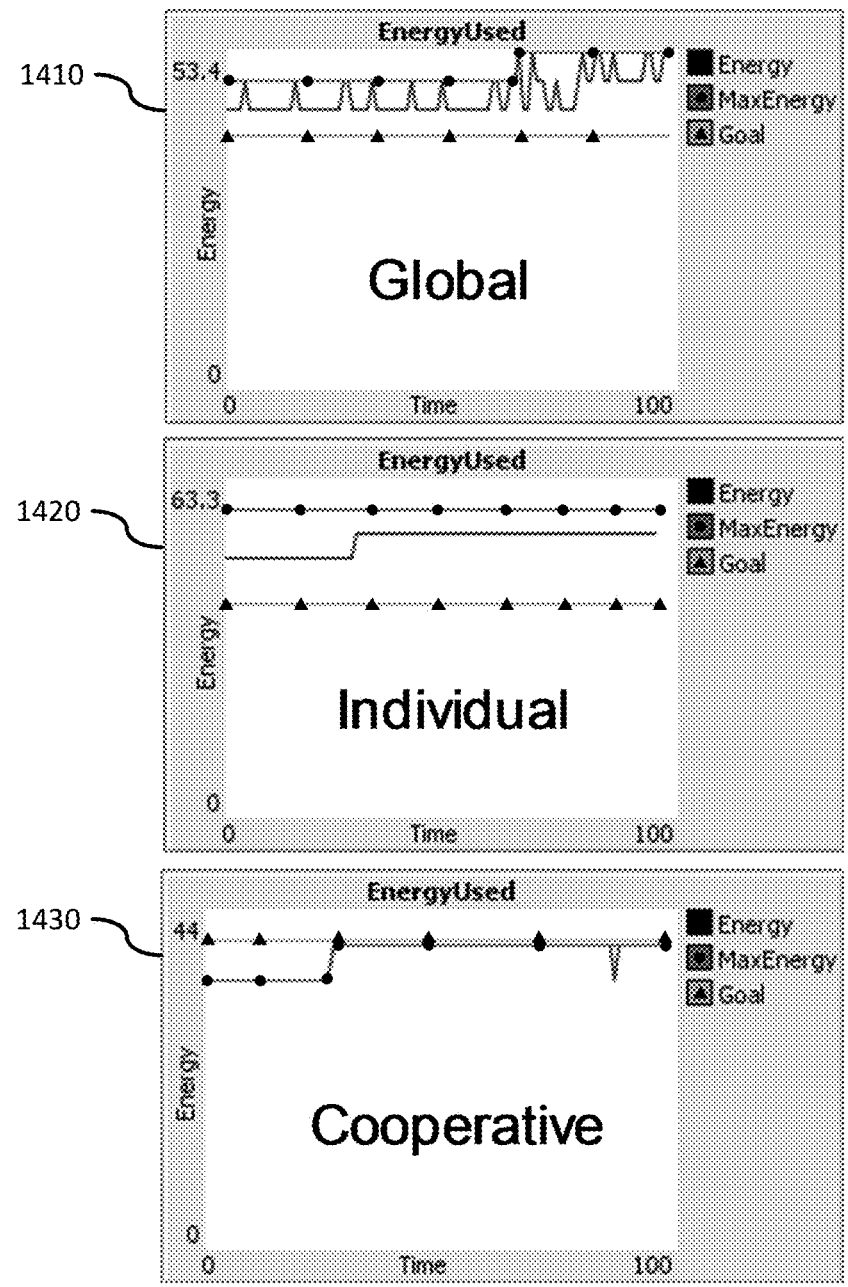
FIG. 14 shows graphs reporting results from a simulation of embodiments of the disclosed technology.

As shown in Table 1 below and in FIG. 14, the cooperative strategy performed in a more stable way than the other two strategies by avoiding peaks in demand. In particular, FIG. 14 shows a representational snapshot of behavior for the global signal technique, the individual signal technique, and the cooperative technique.

As shown in graph 1410, the global signal technique exhibited behavior that is desirably avoided: large initial spikes which trigger a conserve signal. After the 10-minute wait time, there was again a spike as all the water heaters turn on again then settle into chaotic behavior as water heaters decide to honor the signal or not.

As shown in graph 1420, the individual signal technique still exhibited an initial peak, but the behavior is still much smoother than the global signal techniques. The number of time cycles the energy usage was over the goal is still very high especially when water heaters fall below their low water mark.

As shown in graph 1430, the cooperative technique exhibited stable behavior and stayed at the load goal or below until all water heaters had recharged themselves. The model created for this simulation was not intended to be an exhaustive recreation of the power grid.

TABLE 1

Average peak energy use, time cycles over load goal, and recovery time for different agent operational techniques given a load goal

| Energy Goal | Technique | Peak Energy | Time Cycles Above Goal | Recovery Time |
|---|---|---|---|---|
| 40 | Global-signal | 64.7 | 6633.8 | 11:39 |
| 40 | Individual-signal | 58.4 | 4875.8 | 14:58 |
| 40 | Cooperative | 39.5 | 0 | 14:34 |
| 45 | Global-signal | 65.6 | 5058.4 | 10:18 |
| 45 | Individual-signal | 59.3 | 3974.4 | 12:58 |
| 45 | Cooperative | 44 | 0 | 10:33 |
| 60 | Global-signal | 64.7 | 642.4 | 8:38 |
| 60 | Individual-signal | 62 | 84.6 | 8:55 |
| 60 | Cooperative | 57.5 | 0 | 8:29 |

VII. Concluding Remarks

Having described and illustrated the principles of the disclosed technology in the detailed description and accompanying drawings, it will be recognized that the various embodiments can be modified in arrangement and detail without departing from such principles.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

What is claimed is:

1. A computer-implemented method, comprising:
    loading data defining an uninitiated software agent, the data defining the uninitiated software agent comprising executable code for performing an agent task, the agent task being to update executable code for an existing software agent by replacing at least a portion of the executable code for the existing software agent with updated executable code defining an updated software agent;
    identifying one or more destination nodes to which the uninitiated software agent is to be transmitted;
    in response to the identifying, generating data defining an initiated software agent, the data defining the initiated software agent comprising immutable data that indicates identities of the destination nodes, and the data defining the uninitiated software agent; and
    transmitting the data defining the initiated software agent to one of the destination nodes;
    in response to the transmitting, performing the agent task; and
    storing the updated software agent on one or more computer-readable storage media.

2. The method of claim 1, wherein the data defining the uninitiated software agent includes data indicating a cryptographic signature of the uninitiated software agent signed by a creator of the uninitiated software agent, and wherein the method further comprises determining that the uninitiated software agent is authorized based at least in part on the cryptographic signature of the uninitiated software agent signed by the creator.

3. The method of claim 1, wherein one or more of the destination nodes are communicatively coupled to (a) a sensor for measuring an electrical parameter of a power line of a power grid, (b) a sensor for measuring an electrical parameter of a distributed generator coupled to the power grid, (c) an electrical meter for a household coupled to the power grid, (d) a control unit for one or more household electrical devices that receive power from the power grid, or (e) a control unit for controlling power distribution on the power grid.

4. The method of claim 1, wherein the method is performed by computing hardware associated with a first hierarchical level of a power grid, and wherein the data defining the uninitiated software agent is sent from computing hardware associated with a second hierarchical level of the power grid at a higher level than the first hierarchical level.

5. The method of claim 4, wherein the data defining the uninitiated software agent includes data indicating a cryptographic signature for the uninitiated software agent generated by the computing hardware associated with the second hierarchical level of the power grid, and wherein the method further comprises determining that the uninitiated software agent is authorized based at least in part on the cryptographic signature for the uninitiated software agent generated by the computing hardware associated with the second hierarchical level of the power grid.

6. One or more non-transitory computer-readable media storing computer-executable instructions, which when executed by a computer cause the computer to perform the method of claim 1.

7. A circuit comprising computing hardware configured to perform the method of claim 1.

8. The method of claim 1, wherein the method is performed by computing hardware associated with a feeder in a power grid, and wherein the one or more destination nodes correspond to homes powered by the feeder.

9. The method of claim 1, wherein the data defining the initiated software agent further comprises immutable data that indicates configuration parameters for the agent task, data indicating an identity of an initiator of the initiated software agent, and data indicating a cryptographic signature of the initiated software agent.

10. The method of claim 1, wherein the data defining the uninitiated software agent further comprises data indicating resource requirements for executing the uninitiated software agent.

11. The method of claim 1, further comprising, responsive to receiving the data defining the initiated software agent at said one of the destination nodes, and prior to performing the agent task:
notifying the existing software agent at said one of the destination nodes that an update is in progress;
storing a snapshot of a state of the existing software agent; and
terminating execution of the existing software agent.

12. The method of claim 11, further comprising, after performing the agent task, restoring the state of the updated existing software agent from the stored snapshot.

13. A computer-implemented method, comprising:
generating data defining an uninitiated software agent, the data including executable code for performing an agent task, data indicating an identity of a creator of the uninitiated software agent, and data indicating computing resources required to perform the agent task;
identifying one or more destination nodes to which the uninitiated software agent is to be transmitted;
in response to the identifying, gene rating data defining an initiated software agent, the data defining the initiated software agent comprising immutable data that indicates identities of the destination nodes and the executable code for performing the agent task;
transmitting the initiated software agent to one of the destination nodes;
in response to the transmitting, performing the agent task, the agent task including replacing at least a portion of executable code of an existing software agent at said one of the destination nodes with new agent code defining an updated software agent; and
storing the updated software agent on one or more computer-readable storage media.

14. The method of claim 13, wherein the data defining an uninitiated software agent further includes data indicating a cryptographic signature signed by the creator of the uninitiated software agent.

15. The method of claim 13, wherein the agent task is performed at least in part by (a) a sensor for measuring an electrical parameter of a power line of a power grid, (b) a sensor for measuring an electrical parameter of a distributed generator coupled to the power grid, (c) an electrical meter for a household coupled to the power grid, (d) a control unit for one or more household electrical devices that receive power from the power grid, or (e) a power distribution control device coupled to the power grid.

16. The method of claim 13, wherein replacing at least a portion of the executable code for performing the agent task with new agent code comprises adding to the executable code for performing the agent task.

17. One or more non-transitory computer-readable media storing computer-executable instructions, which when executed by a computer cause the computer to perform a method, the computer-executable instructions comprising:
instructions that cause the computer to generate data defining an uninitiated software agent, the data including executable code for performing an agent task, data indicating an identity of a creator of the uninitiated software agent, and data indicating computing resources required to perform the agent task;
instructions that cause the computer to identify one or more destination nodes to which the uninitiated software agent is to be transmitted;
instructions that cause the computer to, in response to the identifying, generate data defining an initiated software agent comprising the data defining the uninitiated software agent and the identities of the destination nodes;
instructions that cause the computer to, in response to generating the data defining the initiated software agent, transmit the initiated software agent to one of the destination nodes;
instructions that cause the computer to, in response to the transmitting, replace at least a portion of executable code of an existing software agent at said one of the destination nodes with new agent code defining an updated software agent; and
instructions that cause the computer to store the updated software agent on one or more computer-readable storage media.

* * * * *